US010078325B2

(12) United States Patent
Gunnarsson et al.

(10) Patent No.: US 10,078,325 B2
(45) Date of Patent: Sep. 18, 2018

(54) SYSTEMS AND METHODS FOR DESIGNING PROGRAMMABLE PARTS FOR MODELS AND OPTIMIZING 3D PRINTING

(71) Applicant: Autodesk, Inc., San Rafael, CA (US)

(72) Inventors: Hilmar Gunnarsson, Gardabaer (IS); Haraldur Darri Thorvaldsson, Reykjavik (IS); Torfi Asgeirsson, Reykjavik (IS)

(73) Assignee: Autodesk, Inc., San Rafael, CA (US)

(*) Notice: Subject to any disclaimer, the term of this patent is extended or adjusted under 35 U.S.C. 154(b) by 349 days.

(21) Appl. No.: 14/705,551

(22) Filed: May 6, 2015

(65) Prior Publication Data

US 2015/0321427 A1    Nov. 12, 2015

Related U.S. Application Data

(60) Provisional application No. 62/046,329, filed on Sep. 5, 2014, provisional application No. 61/989,128, filed on May 6, 2014.

(51) Int. Cl.
| | |
|---|---|
| *G05B 19/4099* | (2006.01) |
| *G05B 15/02* | (2006.01) |
| *B33Y 50/00* | (2015.01) |
| *B29C 64/386* | (2017.01) |
| *B33Y 50/02* | (2015.01) |

(52) U.S. Cl.
CPC ........ *G05B 19/4099* (2013.01); *B29C 64/386* (2017.08); *B33Y 50/00* (2014.12); *G05B 15/02* (2013.01); *B33Y 50/02* (2014.12); *G05B 2219/49023* (2013.01); *Y02P 90/265* (2015.11)

(58) Field of Classification Search
CPC ...... G05B 19/0426; G05B 2219/32128; G05B 19/41885
See application file for complete search history.

(56) References Cited

U.S. PATENT DOCUMENTS

| | | | |
|---|---|---|---|
| 2007/0132779 A1* | 6/2007 | Gilbert | G05B 19/0426 345/619 |
| 2012/0124520 A1* | 5/2012 | Samp | G06F 3/04886 715/834 |
| 2014/0301179 A1* | 10/2014 | Rich | G06T 9/00 369/275.4 |

(Continued)

OTHER PUBLICATIONS

Unknown Author, "Cubify—Express Yourself in 3D", web page <http://cubify.com/store/mrn>, 2 pages, Sep. 3, 2014, retrieved from the Internet Archives Wayback Machine <http://web.archive.org/web/20140903204525/http://cubify.com/Store/MRN>, on Jul. 29, 2015.

(Continued)

*Primary Examiner* — Ke Xiao
*Assistant Examiner* — Raffi Isanians
(74) *Attorney, Agent, or Firm* — Fish & Richardson P.C.

(57) ABSTRACT

Systems and techniques include, in at least one aspect, a method including receiving user selection of parts from a plurality of virtual parts to build a virtual 3D model in a modeling environment, receiving user instruction for modifying or assembling of at least one of the selected parts within the modeling environment, validating the user instruction against physical constraints of an associated 3D printer; and outputting the virtual 3D model for 3D printing on the associated 3D printer after the validating.

19 Claims, 16 Drawing Sheets

(56) References Cited

U.S. PATENT DOCUMENTS

| | | | |
|---|---|---|---|
| 2015/0057784 A1* | 2/2015 | Butler | B29C 67/0088 |
| | | | 700/119 |
| 2015/0066179 A1* | 3/2015 | Stava | B29C 67/0088 |
| | | | 700/98 |
| 2015/0258440 A1* | 9/2015 | Zhang | A63F 13/00 |
| | | | 463/31 |
| 2016/0379420 A1* | 12/2016 | Nakajo | G06T 13/40 |
| | | | 345/419 |

OTHER PUBLICATIONS

Unknown Author, "123D Sculpt+", web page <http://www.123dapp.com/sculptplus>, 11 pages, Jan. 17, 2015, retrieved from the Internet Archives Wayback Macine <http://web.archive.org/web/20150117222447/http://www.123dapp.com/sculptplus>, on Oct. 29, 2015.

Unknown Author, "ModiBot—Buildable Figures Powered by 3D Printing and your Imagination", web page <http://www.modibot.com>, 10 pages, Feb. 19, 2014, retrieved from the Internet Archives Wayback Machine <http://web.archive.org/web/20140209080235/http://www.modibot.com>, on Jul. 29, 2015.

\* cited by examiner

SYSTEMS AND METHODS FOR DESIGNING PROGRAMMABLE PARTS FOR MODELS AND OPTIMIZING 3D PRINTING

CROSS-REFERENCE TO RELATED APPLICATIONS

This application claims the benefit of priority of U.S. Patent Application No. 62/046,329, entitled "SYSTEMS AND METHODS FOR DESIGNING PROGRAMMABLE PARTS FOR MODELS AND OPTIMIZING 3D PRINTING", filed Sep. 5, 2014, and also claims the benefit of priority of U.S. Patent Application No. 61/989,128, entitled "SYSTEMS AND METHODS FOR DESIGNING PROGRAMMABLE PARTS FOR MODELS AND OPTIMIZING 3D PRINTING", filed May 6, 2014, both of which are incorporated herein by reference in their entirety.

BACKGROUND

Conventional three dimensional (3D) printing systems and 3D-capable software packages provide for some capability to design, create, and modify 3D models that can be fabricated directly from the design models. In some known approaches, a designer uses software to build a model, and once complete, the model is sent to a 3D fabricator. It is realized that there are a number of short comings associated with conventional 3D printing systems and design software. For example, some conventional 3D printing systems provide only for design and fabrication of "solid" models or statues. Further, some conventional 3D design systems rely on delivery of the model to a 3D fabricator to solve any issues associated with how a model will be printed and/or to accommodate printing of certain models using additional frames, platforms, rafts, etc., that are typically not available or beyond the expertise of non-expert 3D model generators, or not desired to be printed along with a model due to the work necessary to clean up the printed model.

SUMMARY

It is realized that a need exists for systems and processes to enable full utilization of the capability of 3D desktop printers. According to one aspect, a system is provided that enables novice users to easily design 3D models (including, for example, moveable toys), and print them in 3D using a desktop 3D printer (e.g., a desktop fused deposit modeling ("FDM") 3D printer, stereolithography ("SLA") 3D printer, or other 3D-capable printer). In one or more embodiments, the system provides access to pre-designed parts that include connections configured to snap together once printed. The system generates user interface displays of the parts, includes tools to modify the parts and create new parts, and allows the user to assemble the pieces into a fully realized 3D model. The parts and/or model can be modified in a variety of ways in the system prior to 3D printing. In some examples, users can design parts, design kits, or assemble available parts to build virtual toy models that are optimized for fabrication on a 3D printer. Such virtual toy models include, character models, vehicle models, building models, surrounding models, and prop models, among other options. In some embodiments, nearly any virtual model can be designed and assembled on the system and optimized for 3D printing.

According to another aspect, it is further realized that one of the challenges for desktop 3D printing includes ensuring printability of a generated model. In some embodiments, the printable content in the system is optimized to print efficiently on conventional desktop 3D printers (e.g., FDM 3D printers). For example, the system is configured to constrain model, kit, and/or part design and/or modification to optimize printability. In other examples, the system ensures that any design/model/part generated on the system is 3D printable, and for example, 3D printable without support material or rafts to hold the prints in place on a build plate of a 3D printer.

According to further aspects, the system provides a modeling environment based on programmatically defined components built using Constructive Solid Geometry (CSG) techniques. For example, in toy modeling environments provided by the system, the parts library for the toys is constructed using a programmatic process. According to one or more embodiments, the programmable components enable modular design of individual parts and connection sockets, and in further examples, parameterization and preparation of the parts to enable programmatic behavior in the system. For example, the programmatic behavior includes modifying the parts dynamically in a user interface display, such as making parts wider, longer or higher, all while maintaining the functional elements of the component such as connectors to other parts, and can also include displacing the parts' mesh with the aid of 3D textures, among other options. Additionally, the user interface can render and/or emulate how the physical parts are configured to move—post 3D print and the parts' physical assembly. With programmatically defined components it is furthermore possible to change certain key parameters of a component to change its appearance or functionality. As an example, a user can add additional connectors to a toy component to enable more components to connect to it, or to change the appearance of a component (e.g., by adding additional eyes to a head component) all by modifying basic parameters of the component within the user interface display.

According to another aspect, the system is configured to present a usability optimized user interface to the end users. According to one or more embodiments, the system generates and displays dynamic user interface elements to the end users. In one example, the user interface elements are displayed as rotating sections visually similar to concentric ring portions or cut-outs of wheels having multiple layers that organize functions and/or selectable options. In one or more embodiments, the user interface element is visualized similar to a drawer—that opens and closes in the UI display. For example, the user interface element can be dynamic and based on user interaction with the UI, e.g., the drawer can be displayed at its largest size responsive to user interaction. The drawer is configured to reduce in display size responsive to an elapsed time with no interaction or access to other drawer elements in the UI. Thus, the drawer remains visualized over time, but reducing in size to optimize currently accessed visualizations and/or tools displayed to the end user. The reduction in sizing can be reversed dynamically if the user again interacts with the drawer. In further embodiments, the UI and the display UI elements (e.g., the drawer) are dynamically sized according to the device on which the UI is display. The system/UI can be configured to detect screen size and scale user interface elements accordingly.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one or more embodiments," "at least one or more embodiments," "this and other embodiments" or the like are not necessarily mutually exclusive and are intended to indicate that a particular feature, structure, or characteristic described in connection with the embodiment may be included in at least one or more embodiments. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
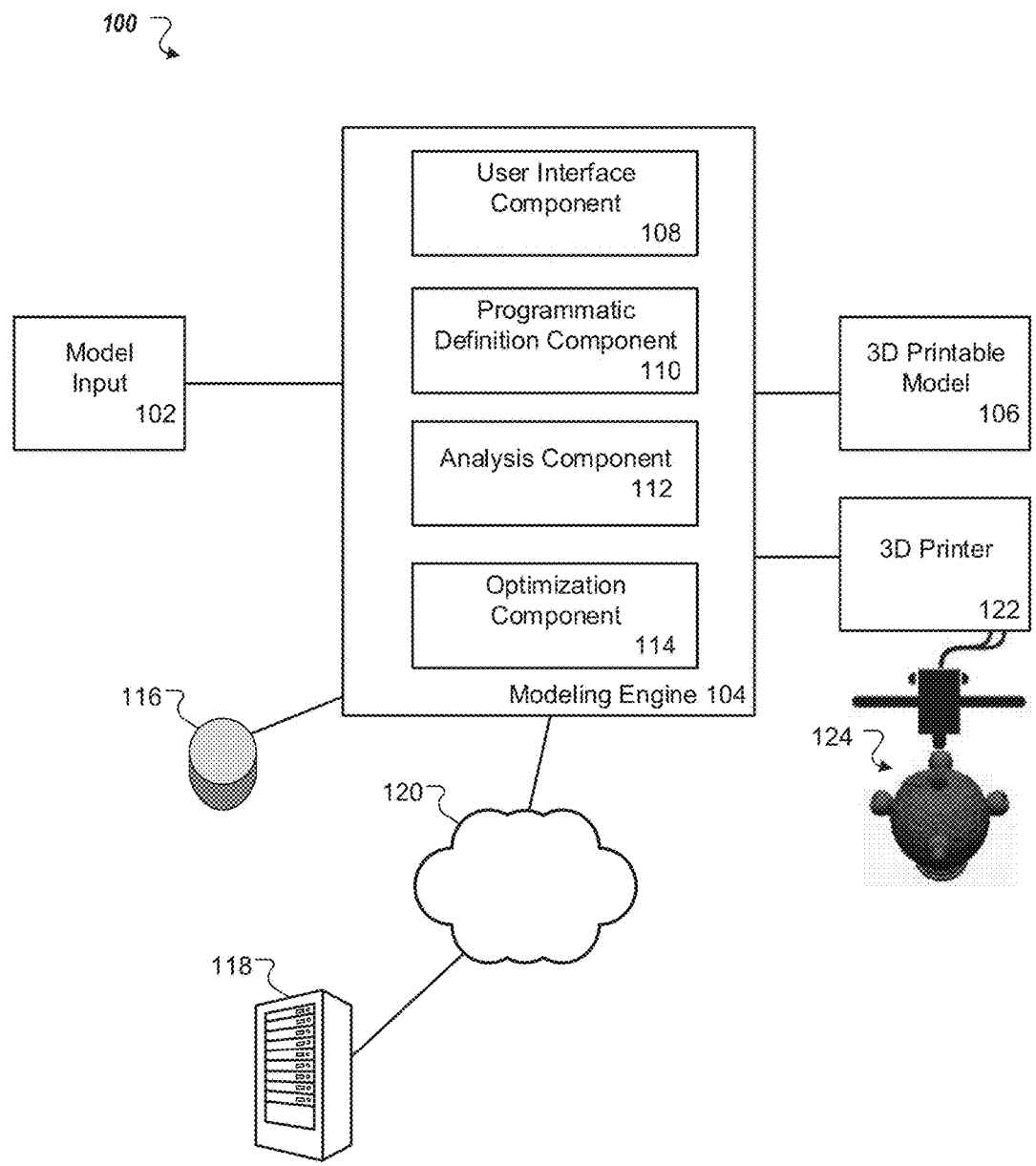
FIG. 1 is a block diagram of an example of a modeling system, according to one or more embodiments.

Stated broadly various aspects and embodiments are directed to systems for managing design and assembly of virtual 3D models to ensure printability, and to optimize fabrication using 3D printers. According to one or more embodiments, the system optimizes model design, for example, toy model design, to ensure printability of the finished model. The system can be configured to provide intuitive user interfaces configured to visually assist users in construction of parts, kits, models, or any other design, and further to simplify modifications of any design. The system can also be configured to optimize the 3D printing of the design/model.

According to another embodiment, the system defines model components (e.g., parts) programmatically. Each model component can be analyzed by the system based on respective programmatic features, for example, to facilitate connection of various parts, ensure each part is printable, constrain modifications of parts to printable ranges, facilitate modification of parts, facilitate modification of the parts' and/or model's mesh, among other options.

The system can be configured to present libraries of pre-defined parts for visual assembly into a 3D model (e.g., of a toy model). The system can provide kits containing all the parts necessary to build a model. Such kits may be purchased by a user and downloaded to a system for design and printing of a 3D model which the user may customize prior to printing. For example, a user can access the system and a kit library to visually assemble each part until the model is complete. Once the visual model is complete, the user can print the parts needed to build a physical object (e.g., the toy). In some embodiments, the system saves the image of the visual model. The saved images include all the programmatic information for each component piece. Thus, the stored model images include all of the build data necessary to fabricate the depicted model (e.g., toy). In further embodiments, the system can be configured to include wiring space in the components of a model. In some examples, the wiring space can be translated into the physical printing of the model, enabling users to introduce electronic components into any model they design or print. In further examples, the visual models can incorporate virtual wiring and/or electronics emulating in the user interface how a model will operate with any introduced electronics.

Examples of the methods, devices, and systems discussed herein are not limited in application to the details of construction and the arrangement of components set forth in the following description or illustrated in the accompanying drawings. The methods and systems are capable of implementation in other embodiments and of being implemented or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is a block diagram of an example system 100 for generating 3D printable models 106 responsive to user input of model information (e.g., 102). According to one or more embodiments, the system 100 can include a modeling engine 104 for executing the functions and operations discussed with respect to system 100. In other embodiments, the system 100 and/or engine 104 can include or instantiate other system components for performing specific functions or operations. According to one or more embodiments, the system 100 and/or engine 104 can be executed on a general purpose computer system (e.g., system 400 and/or 402 discussed below with respect to FIG. 4). In some embodiments, the system 100 and/or engine 104 includes a user interface component 108 configured to generate user interface displays for rendering on an end user computer system (e.g., desktop, laptop, mobile computing system, etc.). In some cases, the system 100 and/or engine 104 includes a mobile computing device and application that can be downloaded onto the mobile computing device (e.g., smartphone, tablet, "phablet", etc.).

The various software and data repository components of the system 100, including the engine 104, can be implemented at various locations, including potentially one or more remote computer systems 118, which can provide services from third parties and which are accessible over a network 120 (e.g., the Internet). These third party services can include access to and use of one or more 3D printers 122 for use in building parts 124 of the 3D printable model 106. In some implementations, one or more of the 3D printer(s) 124 are local to the user of the system 100 (e.g., directly attached to a desktop computer or communicatively coupled to a computing device through a local area network). In any case, when the program components of the system 100 are executing, a platform for designing and fabricating 3D models is provided.

End users can access the system 100 and input model information 102 via the user interface displays. For example, the users can select from a library of component parts rendered in the user interfaces to assemble their own models. In other examples, the user can select and customize the library parts in the user interface. According to some embodiments, each part is programmatically defined such that the user can readily modify its dimensions, appearance, etc., based on modification on one or more dimensions. Further, the system 100 can automatically maintain printability of the modified piece by recalculating the various dimensions according to the programmatic definitions responsive to changes entered in the user interface.

In some embodiments, the user interface provides access to model kits, and can display assembly steps via the user interface displays generated by the UI component 108. In still other examples, user can design their own custom parts by specifying custom dimensions, and/or any connections desired. The custom pieces can be incorporated into larger models, kits, and/or any visual model displayed on the system. In some embodiments, users can design their own parts and/or design kits made up of custom and/or pre-defined parts. The users can develop assembly instructions for their kits that yield customer 3D models ready for 3D printing. Users may be permitted to purchase additional kits or parts through a distributed computer system. Further, users may be permitted to publish, trade, sell or otherwise exchange their own 3D designs using such kits or parts.

Dimensions and characteristics of various connectors can be defined by the system, so that users can select pre-defined connectors (e.g., ball and socket joints). Various connector types (e.g., moveable, fixed, pressure fit, key-lock, etc.) can be defined programmatically and made available by the system for selection in the user interface. In some embodiments, the connectors are configured to provide movable connections between pieces. Thus, the system is able to provide users with the ability to design and fabricate moveable, pose able, interactive physical models.

In some embodiments, the system 100 and/or engine 104 includes a programmatic definition component 110 configured to receive user input and/or store the user input provided, for example, as the user manipulates the characteristic of a component part in a user interface display. The programmatic definition component 110 can be configured to provide programmatic parameterization of each component, connection, and/or assembly. The programmatic parameterization enables the UI component to display part movements, assembly movement, etc. In further examples, the UI component can visualize connections between parts and maintain printability of the components and the overall model based on programmatic constraints maintained by the system. In further embodiments, the UI component 108 can receive information from the programmatic definition component 110 to display emulations of model behavior, including, for example, movements of arms, legs, wheels, etc. of a respective model.

In still further embodiments, the system 100 and/or engine 104 can also include an analysis component 112. The analysis component 112 can be configured to evaluate the properties of the components and/or assemblies of the components to ensure the model does not exceed printable parameters. The user can iteratively add components to a model, modify the characteristic of the components and/or assembly until the model is finalized. In some embodiments, the analysis component 112 is configured to constrain component properties to be within printable ranges for a 3D printer. In some examples, the 3D printer can be registered with the system. The print specifications for the registered 3D printer can then be used by the analysis component 112 to constrain the component properties. In some examples, the system and/or analysis component is configured to constrain model characteristics to ensure printing on FDM 3D printer or other desktop deployable 3D printers.

According to one or more embodiments, the analysis component 112 can be configured to review the print properties associated with a final model to ensure printability. In one example, the analysis component is configured to constrain model characteristics as components are added, and to validate the properties of the entire model once complete. If necessary, the analysis component can modify model properties until the component and final model are validated. In addition to the analysis component, the system can also include an optimization component 114 configured to optimize the execution of the printing of the final model. The optimization component 114 can be configured to analyze the final model to determine a part print order, any requirements to break-up individual pieces to optimizing print, grouping parts by color and/or textures for printing, print sequencing, etc.

As parts are defined and/or modified on the system, the parts and/or models can be saved (e.g., in a loose parts library 116, which can be stored locally or remotely). In some embodiments, users can define their own custom parts and submit their custom parts for use by other users. In some examples, users can design and sell custom parts, models, kits, etc. The parts library (e.g., 116) can include free parts made accessible to all users. The part library can also include premium or pay based components. In further examples, model kits that include all necessary parts for designing a model can be provided as a pay-based service. Each user can then pay to print any number of a particular toy or model once a kit has been purchased and assembled on the system.

The system and/or system components can be configured to execute a variety of functions to facilitate and/or optimize model generation and subsequent fabrication via 3D printing techniques. The following descriptions provide examples of functions, processes, and/or operations that can be executed by the system, the modeling engine, and/or various ones or combinations of the above system components.

Figure 2:
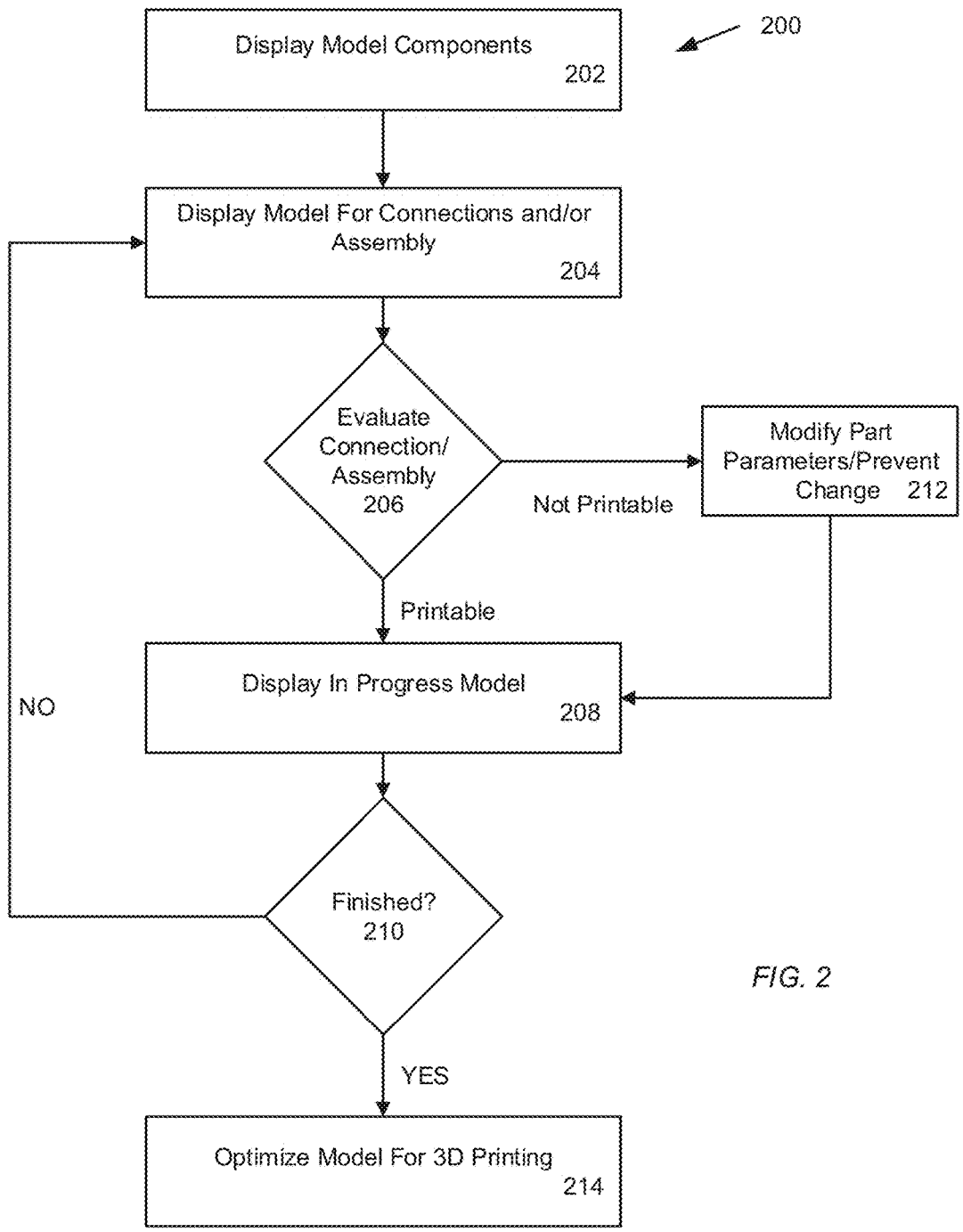
FIG. 2 is an example of a process for generating 3D printable models, according to one or more embodiments.

FIG. 2 is an example of a process 200 for generating 3D printable models. The process 200 begins at 202 with displaying a modeling environment and selectable model components. In some examples, model components can be selected for display in response to user selection of a complete visual model or kit. The components that make up the complete model can then be displayed on a build screen. In one example, component parts can be dragged and dropped on to a build screen display of a user interface. Responsive to user selection of one or more component parts, an in-progress model can be displayed so that a user can connect various components, insert new components into an assembly of parts, and/or modify the displayed components. Process 200 can continue at 204 as a user adds parts to a displayed model.

According to some embodiments, process 200 can include analysis routines to evaluate modifications to parts to ensure that the model remains printable on a 3D printer. For example, process 200 can continue at 206 with evaluation of a connection and/or assembly to determine whether or not the connections and/or assembly will be printable. If a connection and/or modification results in a not printable configuration (206 Not Printable), the part, connection, and/or parameters can be automatically modified by the system to fall within printable ranges (e.g., at 212). In some examples, parts and/or respective connections can be broken up into multiple parts or pieces to ensure printability (e.g., at 212). In other embodiments, or when automatic modification to fall within printable ranges is not possible, the user modifications that would result in not printable characteristics or configuration are prevented at 212. Process 200 includes displaying iterative versions of a model, for example, as new parts are added, modified and/or removed. For examples, as new parts are added and their configuration are determined printable (e.g., at 206 Printable), the resulting model can be displayed at 208. The steps of displaying the model for connections and/or assembly and displaying the model in progress can be repeated for each new part and/or modification made to a visual display. For example, if user is not finished assembling a model (e.g., at 210 NO) steps 204-208 can continue until the visual model is finished at 210 YES. Once the visual model is complete (e.g., 210 YES) the component parts that need to be printed to assemble the physical model, can be optimized for 3D printing (e.g., at 214). For example, colored parts of the model can be grouped by color. Further, singular parts in the visual model can be broken up into multiple components for printing as physical pieces to ensure that the print specifications of a 3D printer are not exceeded. In other examples, print order of parts can be managed as part of 214.

Figure 3:
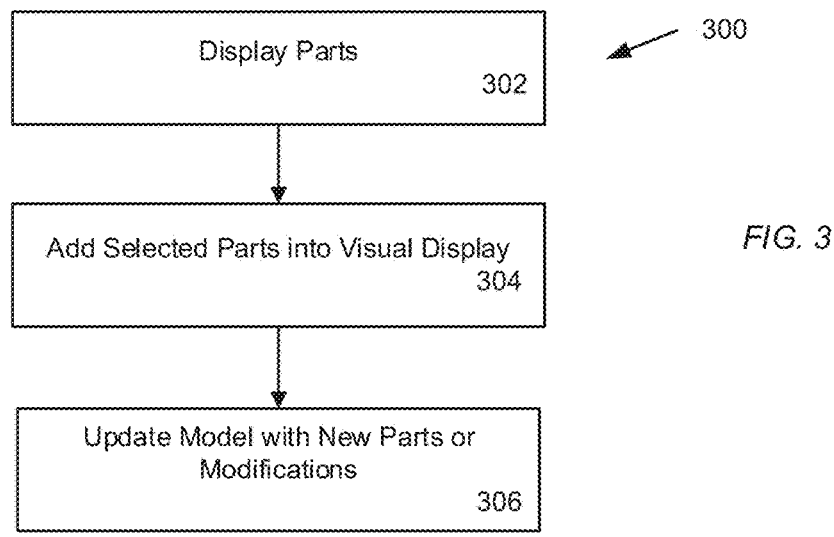
FIG. 3 is an example of a process for generating 3D printable models, according to one or more embodiments.

Further, according to some embodiments, model components include programmatic constraints that prevent modifications into unprintable ranges. In some embodiments, processes for generating 3D models do not need explicit steps for evaluating modification, part additions, etc. for printability. In some examples, as shown in FIG. 3, a process 300 for generating a 3D model can include displaying parts for selection (e.g., at 302). Responsive to selection of parts, the process can include adding the selections into a visual display (e.g., at 304). Further, as new parts are added or modified, the process can include rendering modifications to the visual display of the model (e.g., at 306). Once completed, the visual model can be printed as a physical object, where the physical model includes the displayed properties (e.g., moveable elements) and/or characteristics (e.g., surfaces, textures, wiring channels, etc.) of the visual model.

Example Part Design Process: The 3D objects for the system can be designed using a CSG (constructive solid geometry) like approach, or other 3D modelling techniques. In some embodiments, the system can employ an open source modeling environment as a base platform.

According to some embodiments, the system includes several modifications to the base platform environment. In some embodiments, the system/environment includes support for automatically generating texture coordinates, commonly known as UV coordinates, for geometric objects defined with CSG operations. According to various embodiments, the process for automatically generating texture coordinates is fully automatic and requires no additional parameters from the user performing the modeling (e.g., designing parts or fitting parts together into a model, among other operations). In some cases, each primitive shape, such as sphere or a box, is assigned a set of UV coordinates by the system mapping the primitive's polygons to non-overlapping polygons in a rectangular area of the 2D (UV) plane, implicitly mapping each point on the primitive's 3D surface to a point in the 2D rectangle. In further examples, the mapping is constructed such that the area of a pair of 2D polygons is similar in proportion as the area of the corresponding polygons in 3D. According to some embodiments, this process minimizes the visual distortion of 2D images applied to the 3D primitive via the mapping.

According to some embodiments, as primitives are combined into more complex 3D shapes through CSG operations such as union, intersection, and subtraction, the UV coordinates are preserved by the system, as well as information about which primitive each UV coordinate originates from. For example, when a polygon is bisected by a plane during a CSG operation the two resulting polygons inherit the UV information from the original polygon based on automatic system operation (in some examples one of the two polygons is then discarded, in general, along with one or more of the UV coordinates). The new polygon 3D coordinates created by the bisection are assigned new UV coordinates by interpolation of the original polygon's UV coordinate information by the system.

Once the CSG model is fully constructed any remaining UV coordinates can be re-combined into a new common UV rectangle, as each UV one is defined in terms of its original primitive's UV rectangle, for example, in a process known as texture atlasing. The atlasing process can be configured to ensure that polygons in the CSG model map to non-overlapping 2D polygons in the common UV rectangle while preserving the visual quality of each polygon's original mapping. In some embodiments, the process packs the 2D polygons together in the common UV rectangle as to minimize the area of the region to which no 3D polygon is mapped. In some embodiments, the system executes this approach to increases efficiency when 2D raster images are mapped to the CSG model as a it minimizes the number of raster image pixels that are not visible and do not contribute to rendering nor displacement mapping quality.

According to some embodiments, in the system the geometry component parts and/or assemblies of parts is defined by code. This enables modification of size and appearance of each component and/or assembly with intuitive manipulation of simple input parameters. According to one or more embodiments, the system defines the characteristics of a component so that modification of one input parameter modifies the entire component based on the programmatic definitions. In some embodiments, the UI component translates the modification of the single input parameters into the overall changes for the component visually. For example, as a user modifies the length of the component the width, depth, circumference, and respective connectors are modified according to the programmatic definitions for the component. The adjustments can be displayed visually to the user in various user interface displays (e.g., generated by the UI component 108).

In some embodiments, the system can be configured to manage objects (e.g., components, assemblies of components, etc.) having embedded parametric intelligence, e.g., a single part that needs to be split in two parts to print well, but still allows the user to modify respective size and shape while ensuring the parts will still be able to attach in the physical model after modification of the components in the design model.

In some embodiments, the system automatically embeds within each component (e.g., object file) information required to dynamically change the object's surface in the system with textures. In conventional systems, dynamic manipulation of an object surface would require manual UV mapping of each object, however, programmatic definition of objects enables derivation of a UV map automatically, based on the solids used to build each object. The information can be embedded by the system in each object and/or model file made available on the system.

As a function of building moveable, pose able, and/or interactive toys that can be constructed from component pieces, the system can provide connecting elements. In some embodiments, the system is configured to embed connector information into object files selected and/or created by users, and the location, movement and/or rotation and attributes of each connector (e.g., a part socket) comes preloaded with the object file when made available by the system or created by the user on the system.

According to some embodiments, the system provides a library of connectors that users can select as the user defines connections between pieces. In one example, the system generates a visualization in the modeling environment as the user brings terminal ends of model objects together. In some embodiments, each part is preconfigured with connector information based on pre-defined connector attributes. When compatible connectors are brought into proximity, the user interface can display a visualization that provides the user an indication that a connection can be made. Once the visualization is displayed, the user can "release" the object in the user interface and the system will automatically connect the component parts. Underlying the visual connection shown, the system automatically modifies the programmatic code defining the objects to include the now visualized connection.

In some examples, generic components may not have connectors defined. In some embodiments, as the user attempts to connect such pieces the visualization can be accompanied by a default selection by the system of a connector configured to bridge to the two pieces. The system can modify each objects' code to incorporate elements of the connector. For example, a ball and socket connector can be selected by the system, and on one object the socket is integrated, and in the second object the ball portion of the connected is integrated.

Figure 5:
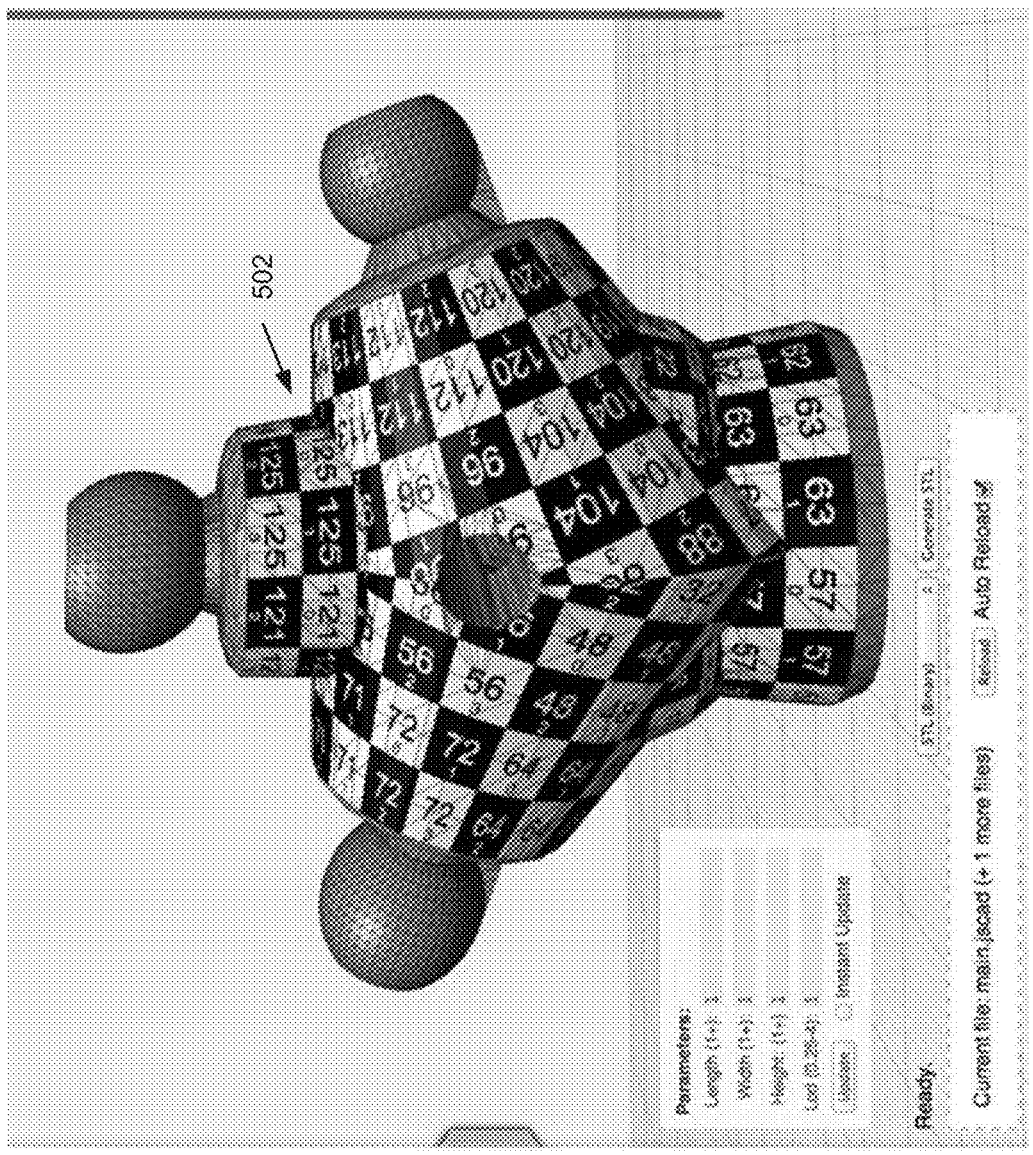
FIG. 5 shows an example CSG modeling environment.

FIG. 5 shows an example CSG modeling environment 500. The object displayed has a texture map that is created automatically by the system in the CSG code and executing functional enhancements discussed above, and the object can include further example enhancements as discussed in greater detail below. According to one or more embodiments, the system includes modeling environment's enhancement to rendering functions, which can be executed by a rendering subsystem. According to one or more embodiments, the rendering subsystem is configured to generate a black and white checkered image raster 502 and render the CSG model using the texture coordinates generated by the system. For example, the checker squares shown in FIG. 5 are of comparable sizes, showing that the generation process executed by the system is configured to hold the ratio of the areas of the 3D and 2D polygons constant. As shown in the example, each square can be uniquely numbered, and each 3D polygon cane be mapped to an exclusive part of the UV 2D rectangle by the system. According to some embodiments, the raster image provides an aid for modeling and visualization, and in further embodiments, the CSG 3D model's UV mapping is ultimately used for mapping of miscellaneous 2D images and displacement maps to the 3D models, for example, as a part of end-user applications.

According to some embodiments, the system is configured to automatically texture map the most common objects used for constructive solid geometry processing, such as a cube or a sphere, and further to generate the texture map as these objects are being combined with other pieces. As the objects are combined by a user in the visual representation shown in the modeling environment, the system automatically modifies the CSG code to create the final object.

The following is an example of Javascript code that builds a portion of the part shown in FIG. 5. According to some embodiments, the uvgrid parameter in the first chest construction command directs the CGS code to generate a texturemap for the shape being added to the resulting geometry:

```
var result = new CSG( );
var baseRadius = 13;
var baseRadiusCutOut = 8;
var interiorHollowRadius = 12
var hipRadius = 12;
var shoulderBallHeight = 15;
var shoulderBallHeight2 = shoulderBallHeight +13;
var pegSocketZPos = 24;
var frontCutoutYPos = -25;
var neckBallZPos = 40;
var neckBallZPos2 = neckBallZPos + 3.75;
var shoulderAngleX = 20;
var shoulderAngleZ = 7;
var chestRadius = 14;
var chestZPos = 15;
var ballPosOffset = 29;
var ballPosOffset2 = ballPosOffset - 6.9;
var socketYPos = 19;
var SocketRadius = 6.5;
//chest and shoulders
var chest1 = new CSG( );
var chest2 = new CSG( );
chest1 = chest1.union(CSG.cylinder({start: [0 * params.width, ballPosOffset *
    params.length - 7, chestZPos], end: [0 * params.width, -4 * params.length,
    chestZPos], radiusStart: .6 * chestRadius, radiusEnd: 1.25 * chestRadius, uvgrid:
    10}).scale([.95, 1, 1])); //holder
chest1 = chest1.union(CSG.sphere({radius: .6 * chestRadius}).scale([1 * params.width,
    .2 * params.length, 1 * params.height]).translate([0 * params.width, ballPosOffset
    * params.length - 7, chestZPos]).scale([.95, 1, 1])); //shoulder end
chest1 = chest1.union(CSG.cylinder({start: [0, ballPosOffset * params.length -6,
    chestZPos * params.height], end: [0, ballPosOffset * params.length -3, chestZPos
    * params.height], radiusStart: 5, radiusEnd: 2.75}).translate([0 * params.width, 0
    * params.length, 0])); //tapered post
chest2 = chest2.union(CSG.cylinder({start: [0 * params.width, -ballPosOffset *
    params.length + 7, chestZPos], end: [0 * params.width, 4 * params.length,
    chestZPos], radiusStart: .6 * chestRadius, radiusEnd: 1.25 * chestRadius, uvgrid:
    10}).scale([.95, 1, 1])); //holder
chest2 = chest2.union(CSG.sphere({radius: .6 * chestRadius}).scale([1 * params.width,
    .2 * params.length, 1 * params.height]).translate([0 * params.width, -
    ballPosOffset * params.length + 7, chestZPos]).scale([.95, 1, 1])); //shoulder end
chest2 = chest2.union(CSG.cylinder({start: [0, -ballPosOffset * params.length + 6,
    chestZPos * params.height], end: [0, -ballPosOffset * params.length + 3,
    chestZPos * params.height], radiusStart: 5, radiusEnd: 2.75}).translate([0 *
    params.width, 0 * params.length, 0])); //tapered post
chest1 = chest1.rotateX(shoulderAngleX).rotateZ(shoulderAngleZ);
chest1 = chest1.subtract(CSG.cube({radius: chestRadius * 2 *
    params.length}).translate([0, -(chestRadius * 2 * params.length), chestZPos]));
    //remove cylinder end
chest2 = chest2.rotateX(-shoulderAngleX).rotateZ(-shoulderAngleZ);
chest2 = chest2.subtract(CSG.cube({radius: chestRadius * 2 *
    params.length}).translate([0, (chestRadius * 2 * params.length), chestZPos]));
    //remove cylinder end
result = result.union(chest1); //add chest
result = result.union(chest2); //add chest
```

Example Distributable Application: In some embodiments, the system provides a modeling platform, which can be embodied in a distributable application. Various embodiments of the application can be tailored to the computing platform on which it will be executed. For example, the application can be tailored for execution on an IPHONE and/or ANDROID environments.

In further embodiments, the system and/or application is configured to take advantage of multi-touch user interfaces available on mobile computing platforms. A variety of the functions provided by the system and/or application can be accessed simultaneously via multi-touch inputs. In some examples, this can include modifying one component's characteristics, while repositioning other components of a model. In further embodiments, the system and/or application can be configured to respond to gesture based controls and/or virtual reality user interfaces.

Example Building Environment: According to another aspect, it is realized that the functions and operations discussed with respect to programmatic definition of model objects is well suited to a 3D toy fabrication environment. According to one or more embodiments, toy models can be built using a library of parts provided by the system. The system can also provide for system defined connections between the parts in the part library. In some embodiments, the parts in the part library come with pre-defined connectors. Thus, even the most novice of users can create new toys by manipulating a visual model, assembling parts from the part library, and 3D printing the component parts for physical assembly.

Figure 6A:
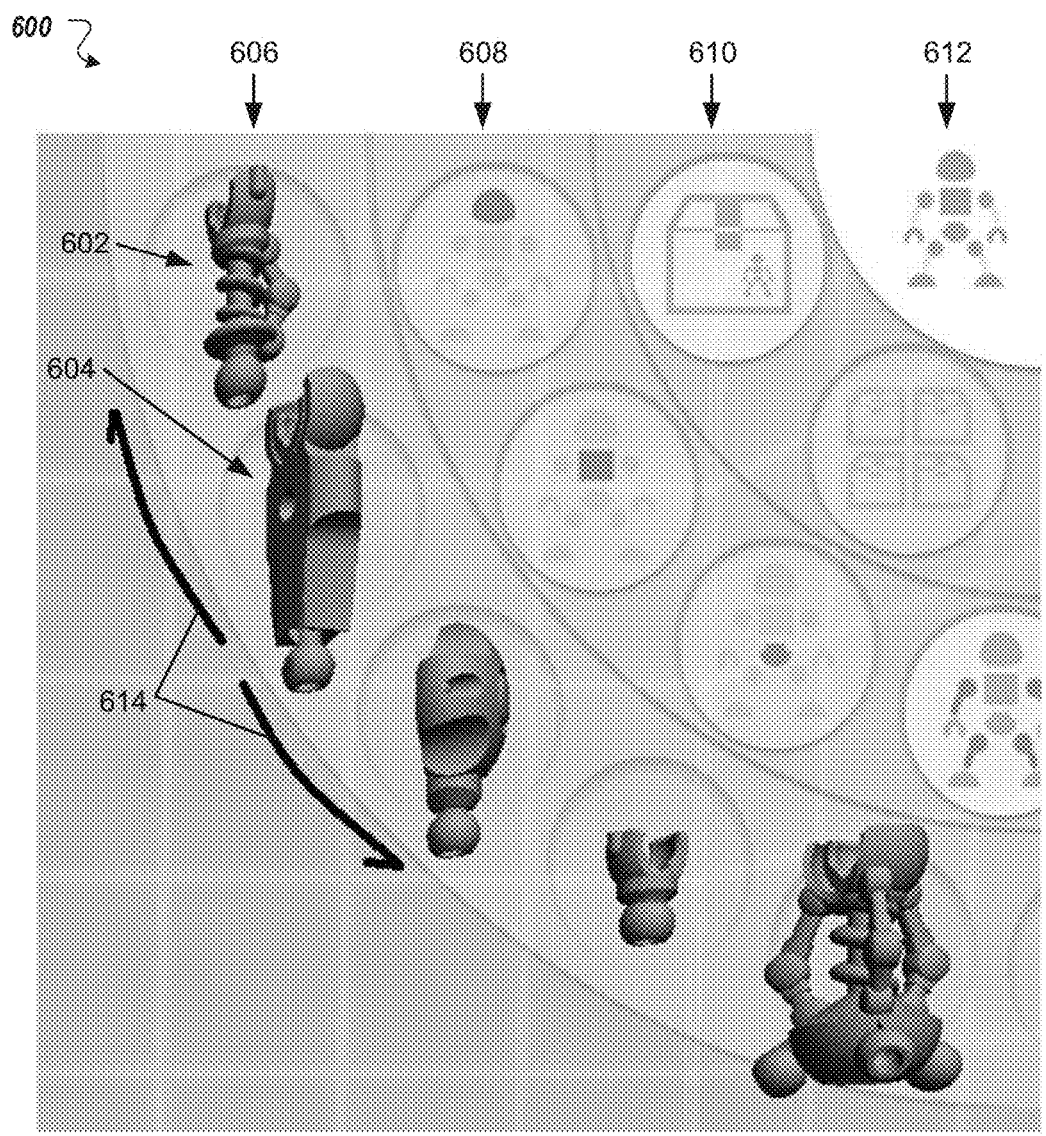
FIG. 6A shows a user interface for accessing a parts library on the system.

FIG. 6A shows a user interface 600 for accessing a parts library on the system. In some environments, various sets of parts (e.g., kits) can be provided for free and/or for purchase during the use of the application. The kits can include all the component parts to build a toy. Various "mods" (including for example customized parts, designs, colors, etc.) can be made available by the system for free and/or for purchase. In some embodiments, various functions of the modeling environment can be made available for purchase to facilitate customization and/or modification of the kits.

To facilitate construction of a toy out of parts from the part library, the user can simply drag the parts (e.g., parts 602, 604) from the library of parts into a workspace display. Moving the parts together in the workspace display causes the system to form connections between the parts. In one example, the system signals where parts can be attached using "electric lines" that are displayed as in the user interface originating from a terminal end of a first part onto a mated connector of a second part. In another example, the first part may include a ball connector and the second part a socket connector. The system can be configured to enable users to attach parts using straightforward drag and drop operation (e.g., that may be performed using a touch screen interface, such as that of a mobile device). For example, a user can drag a part with a first connection (e.g., ball) onto a part with a second connector (e.g., socket). To remove parts, the user simply selects the part in the user interface and drags the part off the connector (e.g., socket) and drops them to the background for later use or throws them off the screen to discard them.

According to one or more embodiments, the part library is accessible via the user interface 600 shown in FIG. 6A. The user interface 600 in FIG. 6A organizes available parts into a part hierarchy. Each ring 606, 608, 610 of the interface 600 shown is associated with a layer of the parts hierarchy.

According to some embodiments, the hierarchical user interface can be arranged based on a pre-selected model 612 the user wished to build. The first layer 610 determines how to query the user's part library (e.g., by all parts or pre-selected models). The second layer 608 of the UI 600 selects which type of part within the pre-selected model. The third layer 606 provides access to the parts that connect to the internal elements and/or form external portions of the model. There are many potential ways to query a part library, including by type of parts (e.g., functional, electronic, static), type of connectors (e.g., few, many, etc.), popular parts (e.g., most used by user, most used by other users), etc. Different embodiments can include UI selectors that are organized based on any combination of the foregoing.

According to some embodiments, each layer shown in the user interface 600 is rotatable to access additional elements where additional elements are available. For example, the outer ring 606 shown can be rotated to display additional parts that can be selected and dropped into the modeling environment (e.g., according to the directional arrows 614).

Figure 6B:
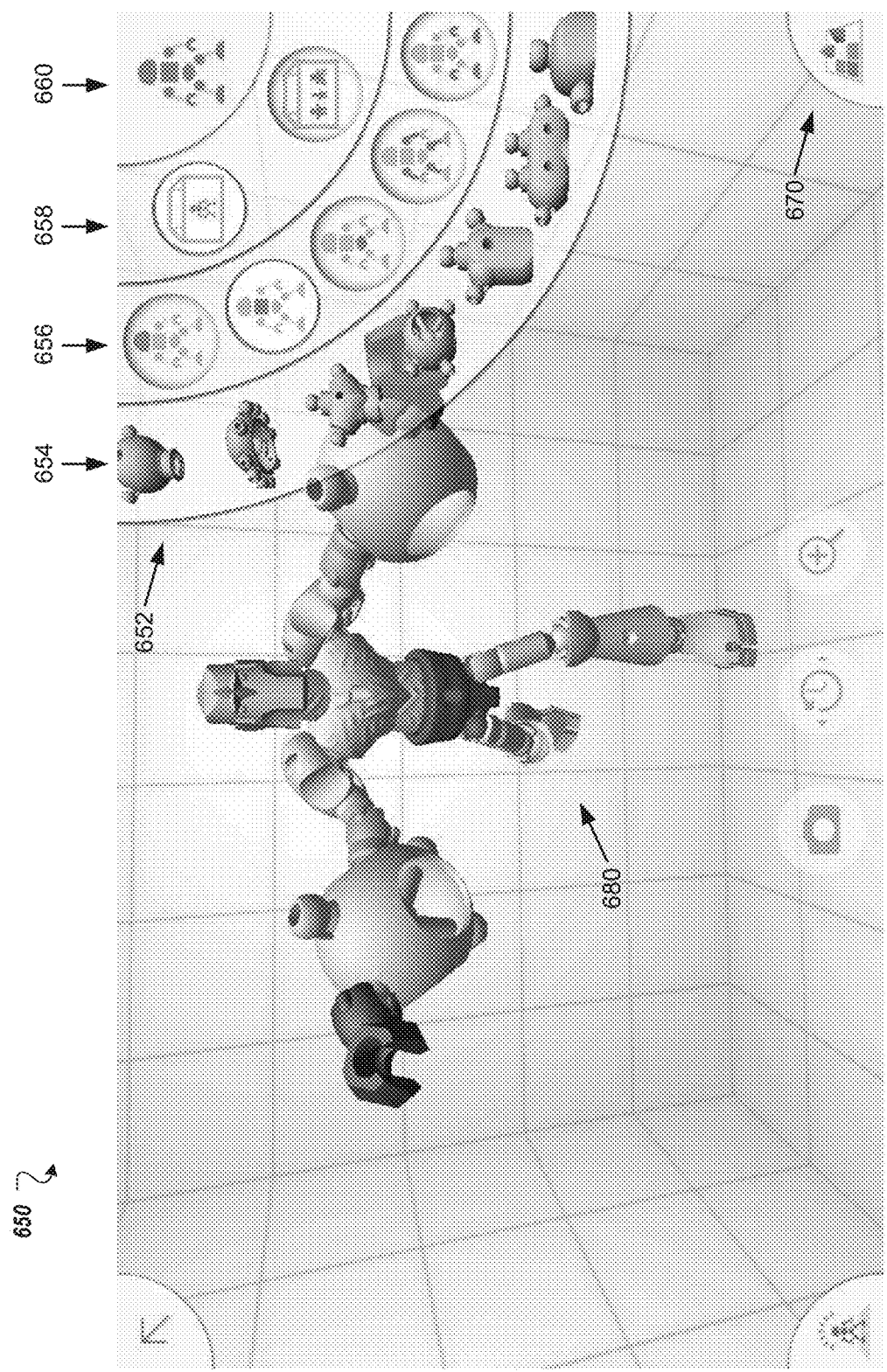
FIG. 6B shows an example of a screen capture of a modeling environment provided by the system and including a user generated 3D model of a toy to be 3D printed.

According to some embodiments, the user interface is configured to display dynamic user interface elements. In one example, each user interface drawer shown in the UI is configured to be dynamically displayed according to user context. FIG. 6B shows an example of a screen capture 650 of a modeling environment provided by the system and including a user generated 3D model 680 of a toy to be 3D printed. At 652, shown is an example user interface element that can be dynamically displayed on the system. In one example, the user interface element is visualized similar to a drawer—in that it can be opened and closed responsive to a user, user activity, and/or user context. At 652, the "drawer" is shown in its fully open display position or its maximal display size. Responsive to a user interacting with the drawer 652 or any respective ring of the drawer (e.g., 654, 656, 658, and 660) the drawer 652 is configured to expand automatically to a maximal display size.

Figure 6C:
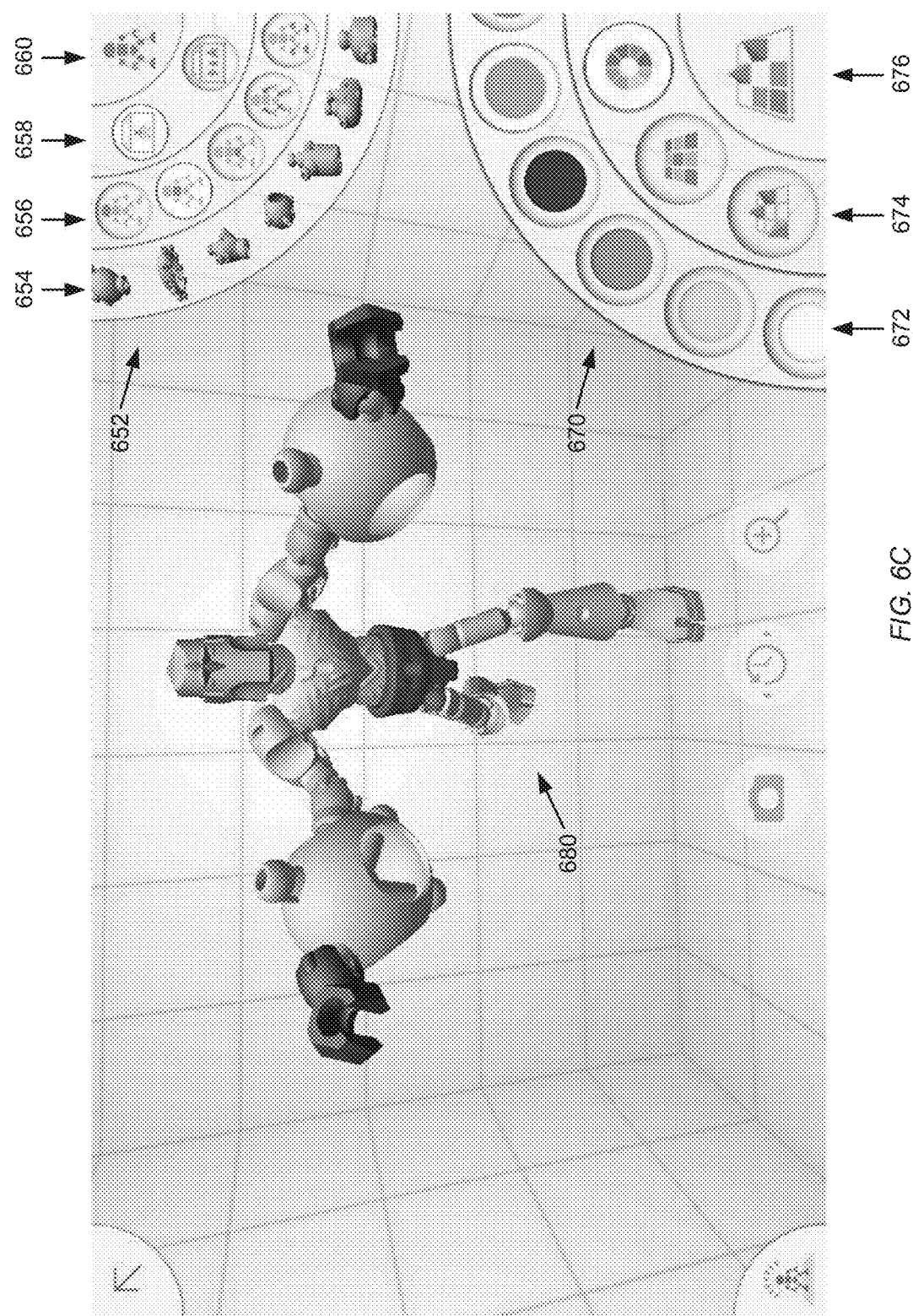
FIG. 6C shows another screen capture of the modeling environment shown in FIG. 6B in a different state of user interaction with a user interface of the modeling environment.
Figure 6D:
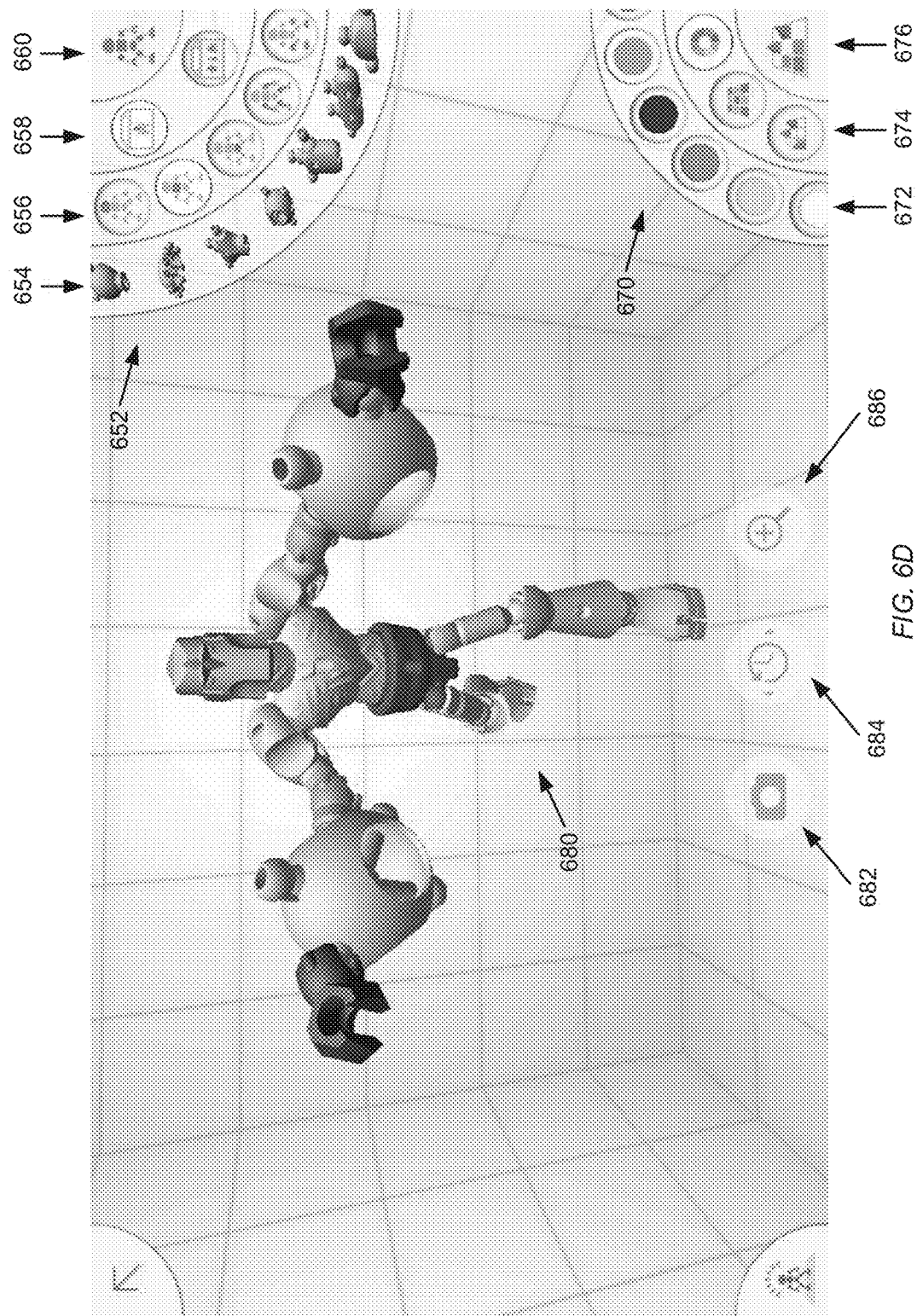
FIG. 6D shows another screen capture of the modeling environment shown in FIG. 6B in yet another state of user interaction with a user interface of the modeling environment.

According to some embodiments, access to a different display element in the UI can be configured to automatically adjust a display size of the element 652. For example, selection of another user interface drawer 670 can cause the system to reduce the display size of drawer 652. In another embodiment, element 670 is dynamically responsive to user context and/or selection. If for example, a user swipes out from 670 in the user interface, element 670 expands to its maximal display size, and in conjunction the system can be configured to reduce the display size of element 652 as shown in FIG. 6C. In FIG. 6C, the UI element 652 is shown in a reduced size, and still fully accessible in this reduced display size, while UI element 670 (e.g., a display drawer for color and texture options/functions) is rendered in a respective maximal display size. In some examples, rather than minimize other UI elements, the system is configured to present them in a reduced display size so that the user can readily access respective functions (e.g., parts library options presented by 652 and respective rings 654-660, and color and texture options within 670, for example within rings 672, 674, and 676). In various embodiments, both UI elements 652 and 670 are dynamically responsive to user context. Thus, both UI elements 652 and 670 are configured to transition to an intermediate display size if a time threshold elapses or in response to a user accessing other user interface options. For example, if the user interacts with the model 680, the respective drawers 652 and 670 are configured to reduce their display size automatically. Interaction with other portions of the UI can be configured to trigger the automatic reduction to an intermediate display size (e.g., shown at 652 and 670 of FIG. 6C). For example, selection of a picture capture tool (e.g., 682 FIG. 6D), time control (e.g., 684 FIG. 6D), or zoom function (e.g., 686 FIG. 6D) will trigger the system to alter the display size of the UI elements. In some embodiments, the system identifies a change in user context based on user interaction with new elements in the UI, and triggers dynamic changes to the displayed UI elements dynamically based on the new context.

According to another aspect, the system presents a dynamic UI in the sense that the UI elements (e.g., corner drawers 652 and 670) maximize in size when the user is interacting with them, and are configured to automatically fade back when they aren't required. In various embodiments, user interaction is improved over conventional approaches. Rather than closing or not displaying UI elements completely, the system enables the user to visualize and remember where the user was last at in the display. In some examples, the dynamic UI enables the user to stay interested in exploring the various possibilities and displayed functions on the system. As the user still sees the different parts and categories (e.g., of part library drawer 652), the user doesn't need to first open the drawer to interact with it. Further, the user can simply start spinning the wheels (e.g., 654-660) around and the drawer will maximize under his finger.

In further embodiments, the elements displayed in the UI are aware of the display state of other elements of the UI. For example, the two corner drawers (652 and 670) can be configured to be responsive to the respective display state of the other display element. For example, if you open one element to maximum size, the other fades back and vice versa. In some embodiments, the system is configured to track display position of other display elements in the UI, including for example, model parts being dragged across the screen. The system is configured to detect a model element being dragged across the UI display, if the drawer is in the way, the drawer fades back. In one example, the system determines the reduction in size dynamically to ensure the part can pass without being obscured. In other examples, the system is configured to adjust the drawer to an intermediate display size or close the drawer entirely if necessary.

In further embodiments, the system maintains a minimum physical size for the UI elements (e.g., parts or library drawer). The system can be configured to scale the display size of the UI elements dynamically as needed. For example, if the device on which the modeling environment is being displayed is big enough—like an iPAD or iPAD MINI—no scaling of the UI/UI elements is done. If the display size of the device a user is employing is smaller than the screen of, for example, an iPAD MINI, the system is configured to automatically scale the display size of the UI and/or UI elements. In one or more embodiments, the scaling factor is linear with respect to display size, until you get to the size of a small computing device (e.g., similar to size as an iPHONE 4). The system is further configured to maintain the aspect ratio of all UI elements dynamically, so the entire application/modeling environment presented by the system is device screen size/aspect ratio independent.

Figure 7A:
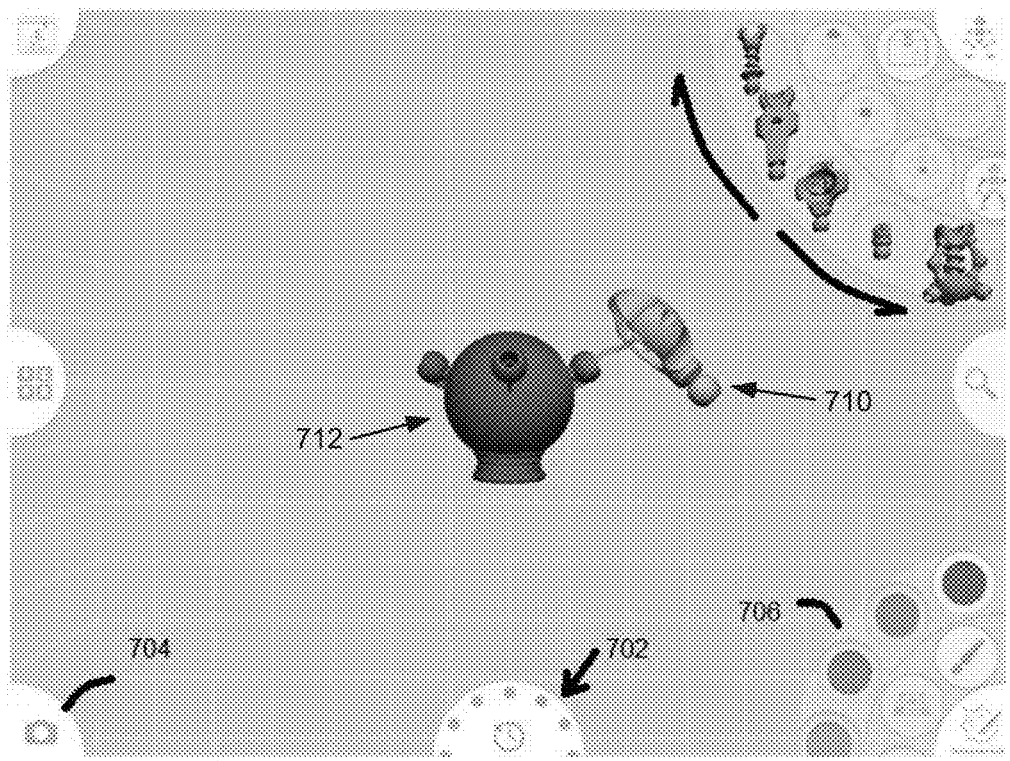
FIG. 7A shows an example of a display of a user interface generated by the system, as a user drags a first part to attach the first part to a second part.
Figure 7B:
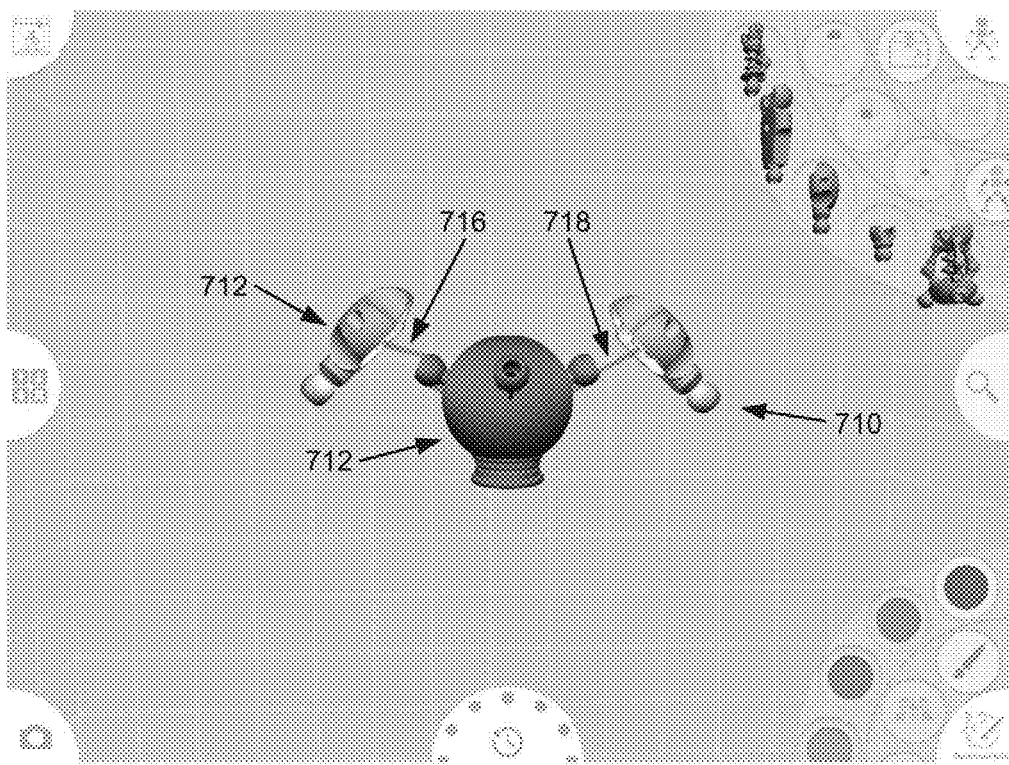
FIG. 7B shows connections made on the system between a plurality of parts in the user interface of FIG. 7A.

FIG. 7A shows an example of a display of a user interface generated by the system, as a user drags a first part 710 to attach the first part 710 to a second part 712. FIG. 7B shows connections 716, 718 made on the system between a plurality of parts 710, 712, 714 in the user interface of FIG. 7A. In some examples, a user can select multiple parts simultaneously and the system is configured to orient and display attachment points as each of the multiple parts are moved into proximity with respective connectors using multi-touch support. In some embodiments, the system is configured to automatically orient parts in the display according to the positioning of part they are linking to, and display connecting lines between the parts to indicate a possible connection.

Example Operating Functions: When the user has put together a model out of two or more parts, the user can manipulate the positioning of the model or pose the model by touching a part and dragging the part to a desired position on the display screen. According to some embodiments, the system is configured to pose multiple parts at the same time since the user interface has been designed to fully support multi-touch gestures and control. As such, modeling in the system can be done by more than one person at a time. For example, two or three children can work together on creating a unique toy.

Figure 7C:
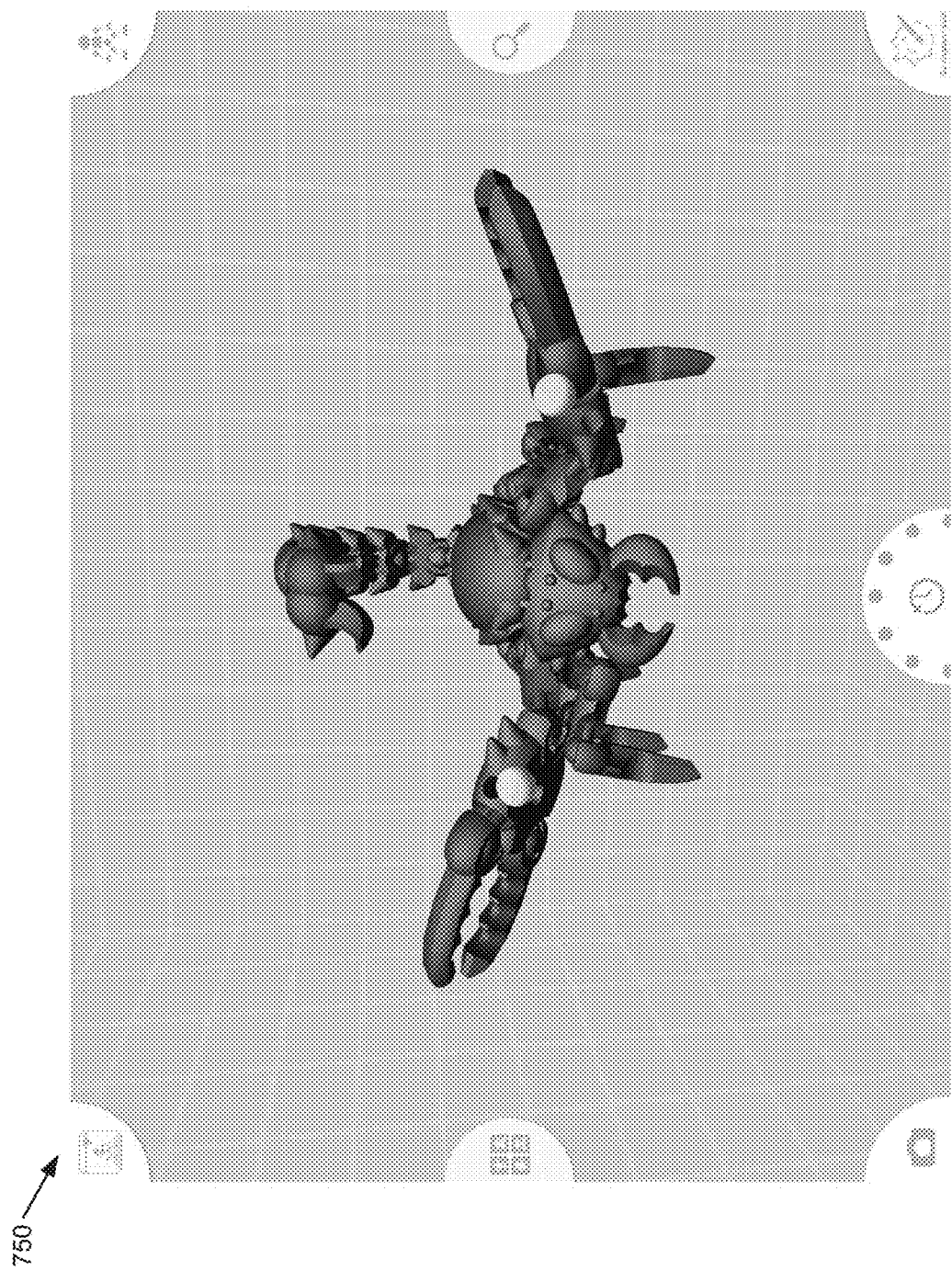
FIG. 7C shows a screen shot of an emulation in the user interface of the parts that form a 3D model.

In some embodiments, the ball sockets used to connect bits together are fully emulated in the system programmatically—when a user moves a part of a model around in the display. For example, FIG. 7C shows a screen shot 750 of an emulation in the user interface of the parts that form a 3D model. The display of the parts is configured to behave according to physical properties the model and/or part will have once printed. For example, the physical constraints for a connector (e.g., ball and socket) are dictated by the design of the socket and emulated in the visual model.

According to some embodiments, inverse kinematics techniques are used to realistically pose models in the system. Touch gestures in 2D screen space are translated into IK targets based on the orientation of the user's camera when viewing the model. Further, according to one or more embodiments, the system's IK solving routines are configured to convert a user's request to move a chosen part of a model to a particular location in 3D space. For example, in response to the user specifying the desired 3D space point indirectly by choosing a 2D point on the model's rendered 2D projection, the system is configured to choose the corresponding 3D point in a manner designed to best match with the user's general expectations. According to one or more embodiments, the system is configured to select a chain of connected model parts, starting with the part chosen by the user, and compute rotation angles for each joint along the part chain such that the chosen model ends at or close to the (2D projection of the) 3D point specified by the user. The IK solver executed by the system can be configured to use an iterated algorithm from a family of IK algorithms knows as Cyclic Coordinate Descent.

The system further allows the specification of constraints on the allowed range of part joint angles. This enables, for example a user to easily position a chain of model creature limbs in a natural and plausible way that doesn't violate the user's expectation for how the creature should move. The constraints are specified by the creature model's designer in the form of a continuous curve on the surface of a 3D sphere defined to surround the joint's center, defining the set of solid angles permitted for parts connecting to that joint.

Undo/Redo: According to some embodiments, undo/redo function are provided in the modeling environment with a time travel control (e.g., FIG. 7A at 702). Rotating or moving the time control in the user interface allows the user to scroll back and forward in the creation history. A part can be removed, unmodified, re-introduced responsive to turning the time wheel 702. According to other embodiments, the time control can be associated with stepwise progression of a model build. For example, a model kit can be accompanied by a sequential animation of the build process. The system can be configured to display the sequence of adding parts to a model to obtain an end result model (e.g., a toy), responsive to rotating the time wheel.

Photos: According to another embodiment, the user can enter a special photo mode where he/she can change the settings and lighting of the scene the model is in and easily share their creation via social media. For example, the user can select a camera image in the user interface (e.g., 704 FIG. 7A) to enter the photo mode.

In further embodiments, the system is configured to automatically take a snapshot of the creation process at specific intervals. The system provides the photos to users and enables browsing with the snapshots. According to some embodiments, the snapshot generated by the system includes the model's build properties such that the user can also choose any of these photos and start to edit the model as it appears in the respective photo. The snapshots provide an editable/buildable photo library ensuring that the user can always go back to a previous model and start designing again based on a previous state if something does not work out well enough.

Auto save: According to some embodiments, the system is configured to automatically save models when changes are made or when new models are loaded into the editor/modeling environment.

Part modification: In further embodiments, the user is permitted to modify each part within the application or system with surface texture or shapes that actually alter the part's 3D geometry. According to one or more embodiments, the system is configured to generate automatic UV mapping of the component parts and displacing the mesh based on a 2D texture file.

For example, each part is divided into a number of tiles where each tile represents a single instance of a texture file. The system is configured to enable the user to displace the part's mesh (e.g., in the UI) to varying degrees with touch gestures that imitate painting on the mesh itself. In some embodiments, the system analyzes the programmatic coding of the parts to ensure smooth transitions between neighboring tiles.

According to another embodiment, the system is configured to add surfaces to parts in layers, so that one layer can consist of, for example, a skin-like texture, while another layer that is added on top of the skin texture contains spikes. The system supports modification of each layer independently, adding or subtracting texture, or clearing all texture layers from the part, responsive to user selection in the UI.

To ensure printability of parts that are being displaced, the system is configured to ensure that the mesh is not displaced in such a way as to create overhangs or objects that are not printable. In one or more embodiments, the system ensures printability by determining at what angle shapes are allowed to extend out from the surface of a part, and calculating the displacement of each polygon while the part is being adjusted. In another embodiment, the system can further constrain such dimensions and or model characteristics based on 3D printer information.

According to another embodiment, the system is configured to constrain alterations on part areas that are designed to sit on the print bed when printing, and further prevent alteration of connectors that would cause the connectors to fail to mate. According to one or more embodiments, the system can limit areas that are editable and display to user which areas are modifiable or not via a graphical overlay of the part's mesh.

According to some embodiments, the UI is configured to transition between a display mode and a part modification mode. In modification mode, the system can be configured to respond to users input of new texture or shapes to a mesh, or allow users to erase texture or shapes that have been drawn onto a mesh.

Figure 8A:
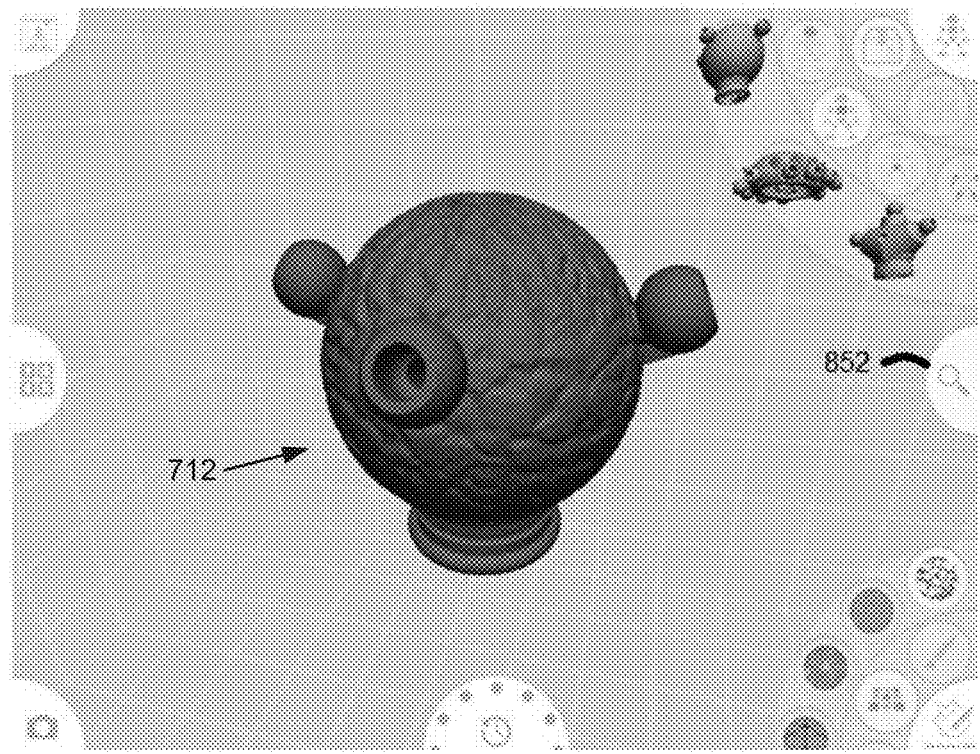
FIG. 8A shows an example of surface texturing functionality provided by the system in the user interface.
Figure 8B:
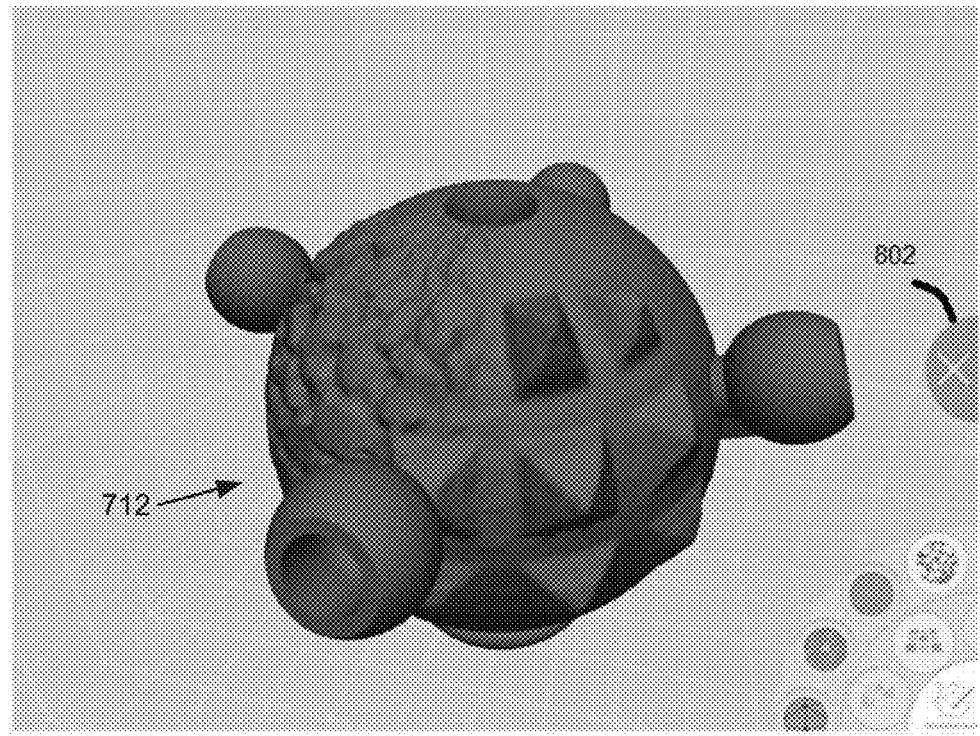
FIG. 8B shows a detail modification mode for the surface texturing functionality in the user interface of FIG. 8A.

FIG. 8A shows an example of surface texturing functionality executed on the system. FIG. 8A shows a texture being applied globally to the part 712 from FIG. 7A, while FIG. 8B shows a detail modification mode, entered into by the user by selecting, e.g., a magnifying glass function shown in FIG. 8A, where the system is responsive to user input where the user can paint a texture onto the part with his finger. Each mode can be entered responsive to user selection in the UI (e.g., selection of 802 enters a global mode and 852 enters a detail mode).

According to one or more embodiments, the system enables users to modify the size and shape of each part by altering simple parameters like width, height and length, etc. In some embodiments, the user can drag on features of parts in the display to alter width, height, number of connectors, or add other features (e.g., eyes). In some embodiments, the user can switch out different sub-forms of a part to modify the part, like different eyes, noses, helmets etc. Both positive shapes such as eyes and nodes and negative shapes such as chin dimples and eye sockets, are candidates for being switched out. In some embodiment, the user can add surface details such as spikes and other shapes and holes to be embedded in part surfaces. In some embodiments the system allows the creation of a static version of models, where all movable joints on all parts are replaced with simpler forms that are then fused together into a single model that permanently holds a certain pose and cannot be adjusted into a different pose.

According to some embodiments, each user can draw or write his name/branding on a part to truly make the model his own. Further, the system enables the user to apply color to individual parts to visualize what the physical (e.g., the 3D printed model) will look like when printed with different types and colors of plastic. The user interface can include a color palette display (e.g., 706, FIG. 7A) that enables user selection of color for parts and/or assemblies in the visual model. According to one or more embodiments, the user can also draw on each part, i.e., as opposed to painting a part with a single color, and print such parts and any drawings on them via full-color 3D printers.

Figure 8C:
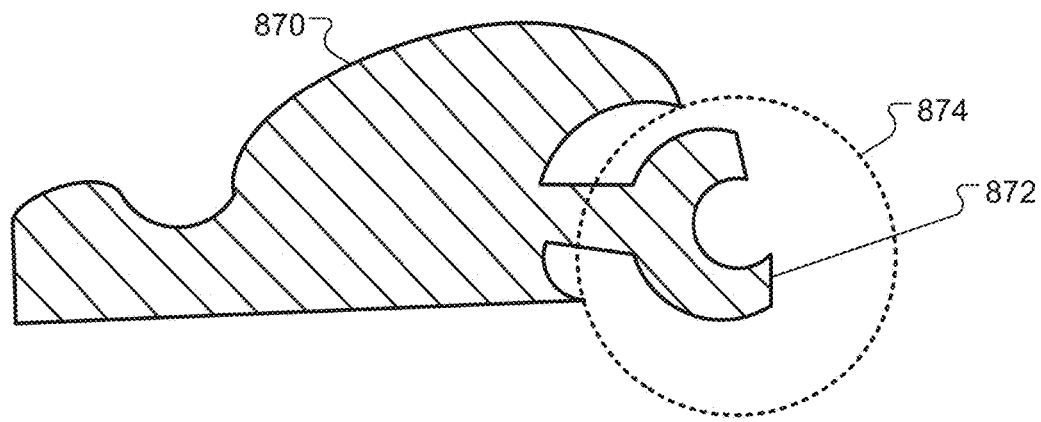
FIGS. 8C-8D show an example of modification using CSG operations.
Figure 8D:
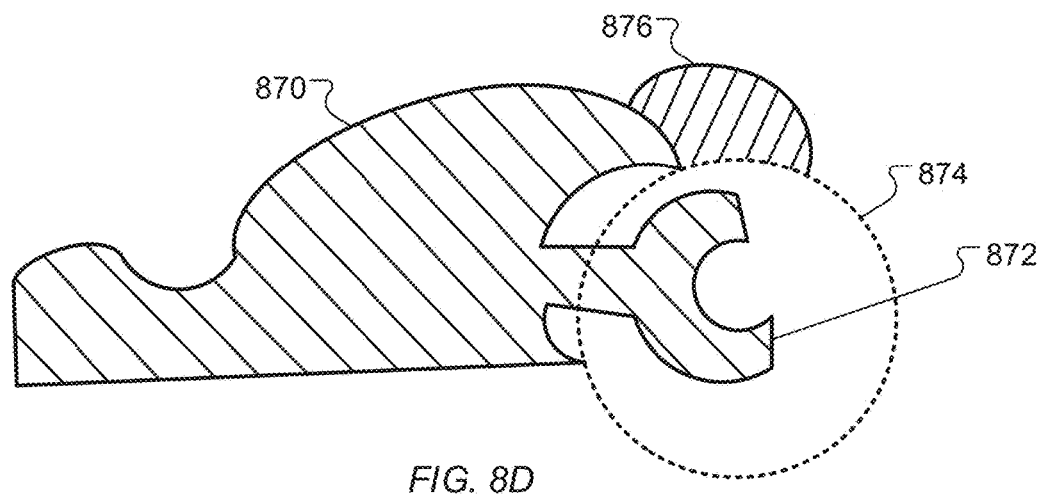

The system can be configured to manage not only changes in the size and shape of parts but also to perform CSG-like functions, which can include, for example, adding shapes to parts or hollowing out sections of parts with carve-out tools, adding new sockets and connectors and/or removing sockets and connectors from parts. According to some embodiments, the user is able to make drastic changes to displayed parts while maintaining the printability of each part, as the system preserves printability based on managing CSG functions and programmatic definition of the parts. In some embodiments, the system orders CSG operations in such a way as to prevent changes leading to unprintable parts. For example, parts may have a receding socket that is partially housed within the part. FIGS. 8C-8D show an example of modification using CSG operations with such a part.

In FIG. 8C, a socket 872 is placed in spherical in subform 870 that is defined by subform 874. The system may allow a user to add one or more additional subforms to subform 870 that alter the shape of subform 870. For example, a new subform 876 can be added, as shown in FIG. 8D. By ensuring that the CSG operation that carves out subform 874 from subform 870 is always performed subsequent to any operation that adds a subform 876 to subform 870, the system ensures that subform 876 cannot overlap with and protrude into subform 874. This preserves the integrity of any subform that is added to subform 870 subsequently to both subforms 870 and 874, such as subform 872.

According to one or more embodiments, the system is configured to allow users to create parts that typically would exceed printable ranges. For example, the system can permit certain deviations from printable ranges, including excessive overhangs and/or lack of support material. In such cases, the system is configured to split the non-compliant part into two or more parts that are determined by the system to print well and within printable ranges for a given 3D printer. The system can automatically create connectors to attach the resulting pieces together after they've been printed.

Example Part Design Characteristics: According to various embodiments, the parts made available by the system (for example, through the parts library) are designed and optimized for printing on desktop 3D printers such as FDM (fused deposition modeling) 3D printers or stereolithography (SLA) 3D printers. This can include one or more of the following examples: (1) Ensuring that there is a sizeable piece of the part that sits flat, and positioned for printing on the print bed of the 3D printer to ensure stability during printing and adhesion to the print bed. (2) Designing overhangs, i.e., areas that have no direct material beneath them, in such a way that they print well. In some embodiments, the system is configured to optimize the angle at which parts can extend into thin air so no support structure is needed. (3) Strengthening parts, sockets and balls with internal support structures, e.g., strengthening a ball shaft with an integrated "tunnel." By introducing the tunnel into the ball shaft the resulting physical structure is much stronger than a regular "solid" shaft that is filled with varying degrees of infill by the 3D printer. It is realized by including additional structures into various printed parts, the system can manage the resulting strength of the respective part. Under conventional approaches, 3D printers have default settings for infill that do not achieve a desired strength for the part. By introducing additional structures (e.g., tunnels) into each part, the system prevents infill default from being used during the printing of a model.

According to some embodiments, the parts provided by the system can include "wire tunnels" to allow for easy wiring of physical models and integration of electronic components such as light emitting diode (LED) lights, Arduino boards, etc., into the resulting physical models or toys. According to some embodiments, the wire tunnels serve the functional purpose of wiring the models, and also serve as the vehicle for strengthening the models as described above (e.g., with respect to overcoming infill defaults of conventional 3D printers).

In some embodiments, the printing of parts is discussed with respect to FDM printers. In other embodiments, the optimizations discussed for 3D printing are effective for other types of 3D printers as well (e.g., selective laser sintering printers—"SLS" printers).

Figure 9A:
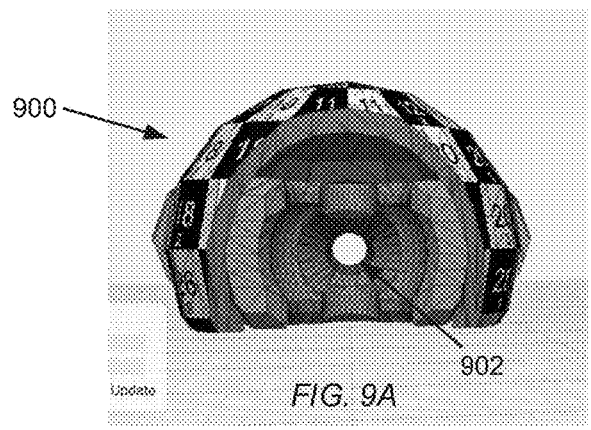
FIGS. 9A-9C show different views of a connector part with a wire tunnel going through the part.
Figure 9B:
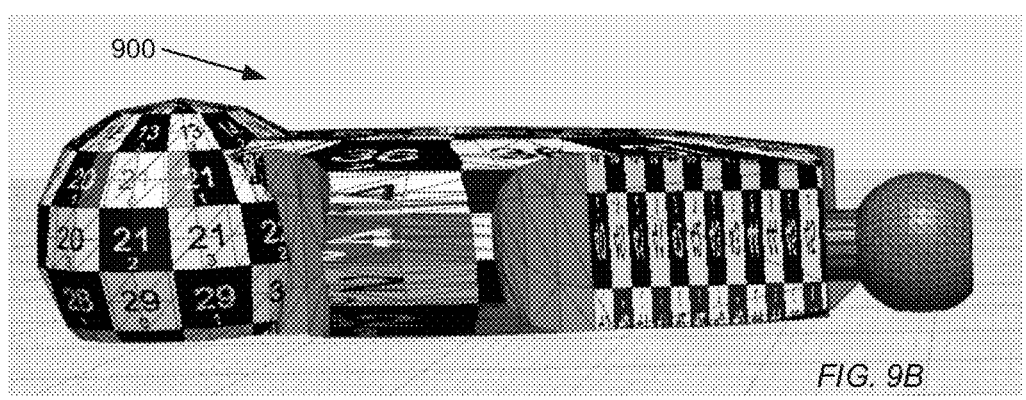
Figure 9C:
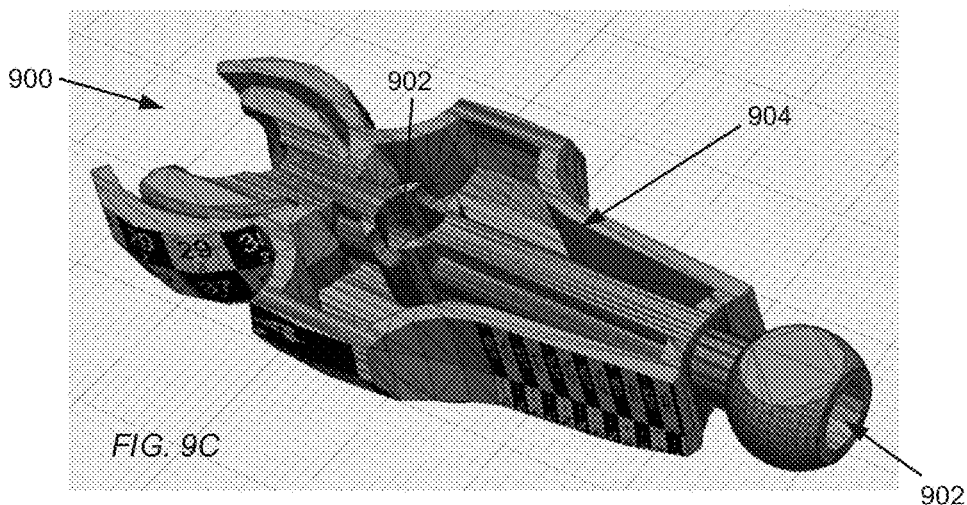

FIG. 9A shows a connector 900 of a part with a wire tunnel 902 going through the part. FIG. 9B shows a side view of the same part 900, and FIG. 9C shows the inside structure 904 of the part 900, including the wire tunnel 902. According to some embodiments, the system optimizes the printing of the parts and configuration of the wire tunnels to ensure that the tunnels go through the part and to position holes in the vertical openings of the part to allow residue from SLS 3D printing to escape out of the hollow space.

Example Connector Design: According to various embodiments, the connectors used to bridge parts in the modeling environment are optimized by the system for printing on 3D printers. For example, the ball and socket connectors that connect parts can be optimized for printing on desktop 3D printers using thermoplastics, such as ABS (acrylonitrile butadiene styrene) or PLA (polylactic acid) plastics, as well as other materials available for 3D printers. In further embodiments, not only are the parts optimized for printing on 3D printers, but the resulting characteristics of the parts are optimized to ensure functional use and longevity of the connectors. For example, the system can be configured to ensure functional use of the ball and socket connectors using PLA as a print medium. It is realized that PLA is more brittle than ABS and has a tendency to lose its' shape over time. The system can be configured to compensate for these properties by introducing additional parts or voids within components, for example, to overcome default infill settings.

As most 3D printers use infill material to fill up solids, the system can be configured to incorporate internal support structures, for example, into the sockets. The internal support structures force the 3D printer to strengthen the socket due to the presence of the internal support structures. Stronger connectors ensure better connection and resiliency during use. In one example, strengthening the socket ensures a firm hold on a ball connector that does not lose too much of tension over time and movement.

Figure 10:
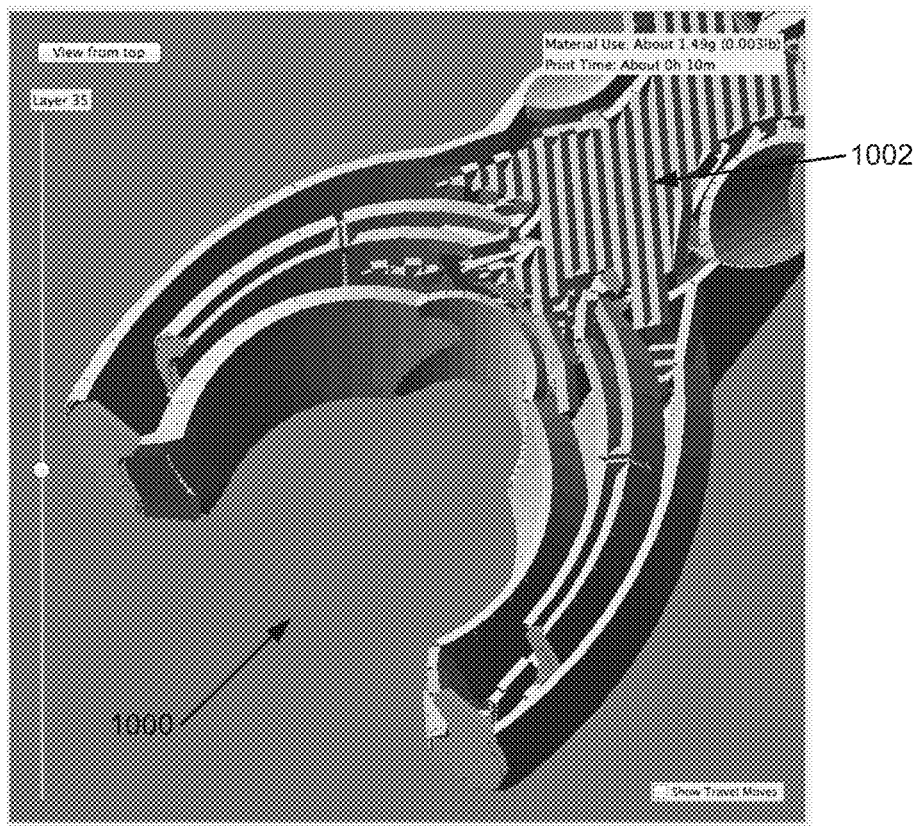
FIG. 10 shows an example of the internal structure of a socket as displayed by the software that slices parts for 3D printing.

FIG. 10 shows an example of the internal structure of a socket 1000 as displayed by the software that slices parts for 3D printing. The slice view of FIG. 10 shows the toolpath (Travel Moves) of the printhead as it prints the part 1000. Normally, the inside of the socket connector would be hollow or filled with small amounts of infill, however the system has introduced an internal structure 1002 into the design of the socket that forces the 3D printer to add more material to the socket. The additional material makes the part stronger and able to hold connecting parts longer that convention 3D prints that use regular infill. According to various embodiments, the internal structure selected by the system varies between connector sockets that are printed horizontally and vertically. In some embodiments, vertical sockets are configured to be stronger in light of how layers are added on top of each other using FDM 3D printing techniques.

Figure 11:
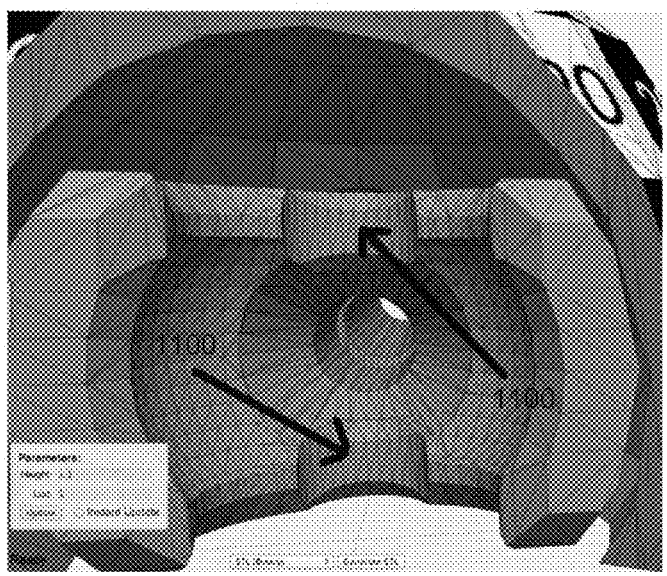
FIG. 11 shows indents at the back end of a socket configured to give the socket enough flexibility to bend and also to provide this flexibility to wires that are embedded within the parts.

As discussed, in various embodiments parts are optimized to include wiring channels. For example, sockets are optimized for wiring, where the tunnels introduced are configured to provide the wires enough room to bend along with the movement of a connector (e.g., the ball socket) without being damaged or cut on the socket housing. FIG. 11 shows indents 1100 at the back end of a socket configured to give the socket enough flexibility to bend and also to provide this flexibility to wires that are embedded within the parts.

According to one or more embodiments, the system supports a variety of socket designs and connectors. In some examples, the connector provided are designed for character building while others are designed for vehicles and buildings (e.g., including static connectors that don't require movement).

Template Mode Embodiments: According to various embodiments, the system can include a special mode that teaches users how to build complex models. Through the use of "blueprints" provided by the system, users are guided in steps through the process of identifying the right parts for a model and attaching them in the right places. Users can furthermore choose to skip back and forth during the building process to either repeat certain steps of the process or to skip steps.

Figure 12:
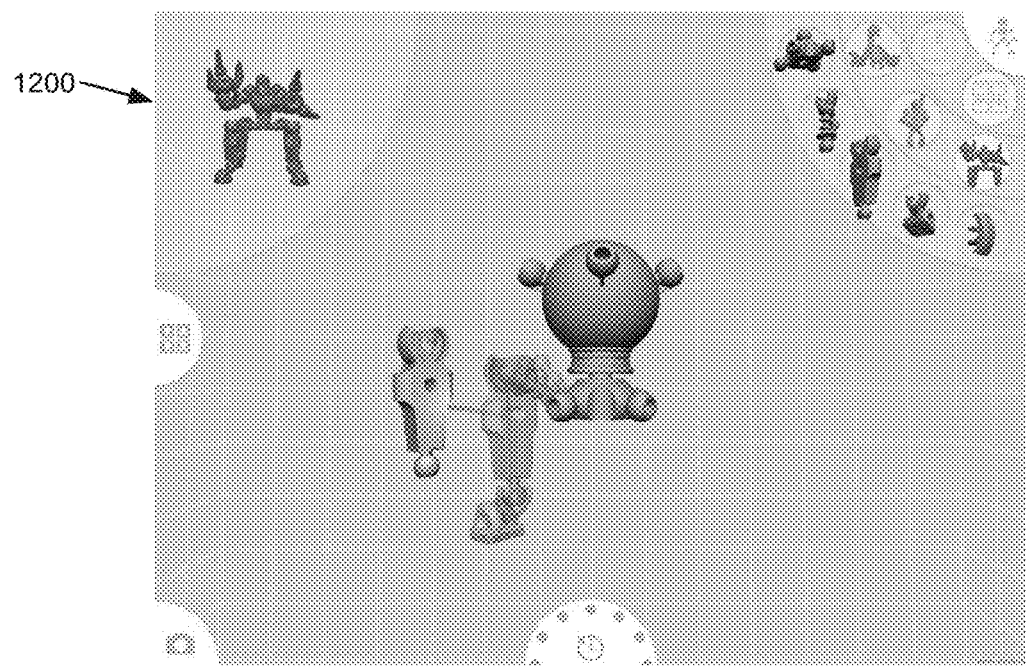
FIG. 12 shows an example screen capture of a training or template mode provided by a user interface in the system.

FIG. 12 shows an example screen capture 1200 of a training or template mode provided by a user interface in the system. The system shows the selection and addition of parts onto a model in the UI. The system can display use of the part selector in the upper right corner to select a given model (in some examples, the end result of the selected model can be displayed to the user). The system steps through the process of assembling the parts of the model for the user. The time control displayed at the bottom of the UI can be used to replay steps, advance the system through the process, or reverse any step shown. According to one or more embodiments, the system includes an "auto play" mode where users can watch a model being built out of blueprints.

According to one or more embodiments, parts in templates may contain logic and behaviors that are linked to the type of model being built with a template, including, for example, animations, walk cycles, and other contextual attributes such as the name of the character, the tribe or universe it belongs to, back story for the model and/or toy, among other options.

Example Part Attributes: According to one or more embodiments, parts may contain specific attributes like weight, strength, etc., which can affect the behavior of a model created out of the parts. For example, when the model is animated the specific attributes can be used to modify the model's operation. In another example, weight, strength, speed, endurance, etc., can be parameters that are based on how a model is constructed. The models can then be introduced into game contexts where the model's characteristics affect game play.

3D Print Mode Embodiments: According to various embodiments, the system can include a 3D print mode. The 3D print mode is configured to present the user with a simple user interface where the user can choose whether to print all parts of a model or limit the print job to a subset of parts. Responsive to user selection, the system is configured to optimize the arrangement of any selected parts on a number of build plates—complex models often need to be split into several print jobs on a 3D printer, and each can be represented by a separate print file.

In some embodiments, the user can change the settings for the 3D print. The system can be configured to automatically rearrange all parts as required. In one example, this includes changing the size of the model to be printed (larger size means larger parts that need to be split among more print beds) and determining by the system whether the parts should be split based on color as the user may select to print models using a single color even though the model in the system has been painted in multiple colors.

Figure 13A:
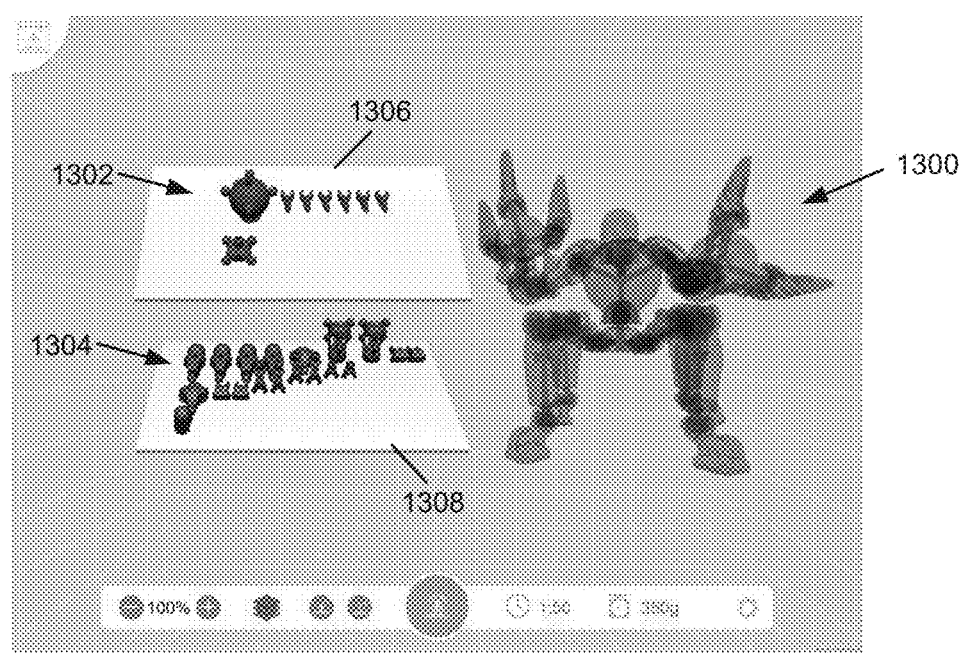
FIG. 13A shows a model being displayed in a print user interface based on the parts that need to be printed.

In one or more embodiments, the system accepts user selection and/or de-selection of parts to print, based on the user touching the respective parts on the model. FIG. 13A shows a model 1300 being displayed in a print UI based on the parts 1302, 1304 that need to be printed. The system can determine which parts should be printed together and represent this determination by organizing the parts 1302, 1304 on virtual representations of the each build plate, as shown. In some examples, the user can interact with the UI to remove parts 1302, 1304 from the virtual build plates 1306, 1308 presented in the UI of the system so they are not printed.

In some embodiments several options are provided to the user to send print files to a 3D printer, including any one or more of the following: (1) The user can download the 3D print files directly to a computer from his tablet device, where he can then prepare the files for 3D printing using slicing software such as the MAKERBOT desktop app or similar software. (2) The user can upload the 3D print files directly to a cloud library where he can then access them from either a tablet, PC or the 3D printer itself (3) The user can send the 3D print files directly to a 3D printer for printing. (4) The user can order the model from a 3D printing service.

The system can output individual parts as a collection of a ZIP of STL files grouped by print plate, where the grouping of the parts by print plate is determined by the system. The system can also output 3D printer specific file formats such as .thing that preserve the layout of the parts as prepared by the system.

Figure 13B:
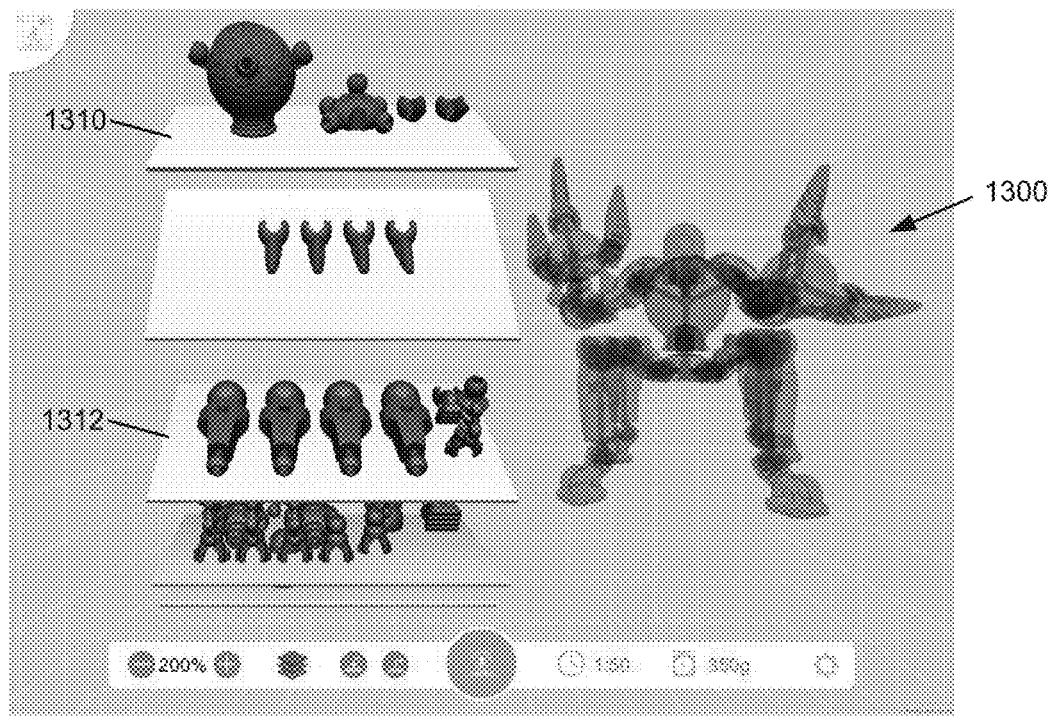
FIG. 13B shows the print user interface of FIG. 13A including any enlarged parts and the additional build plates required.
Figure 13C:
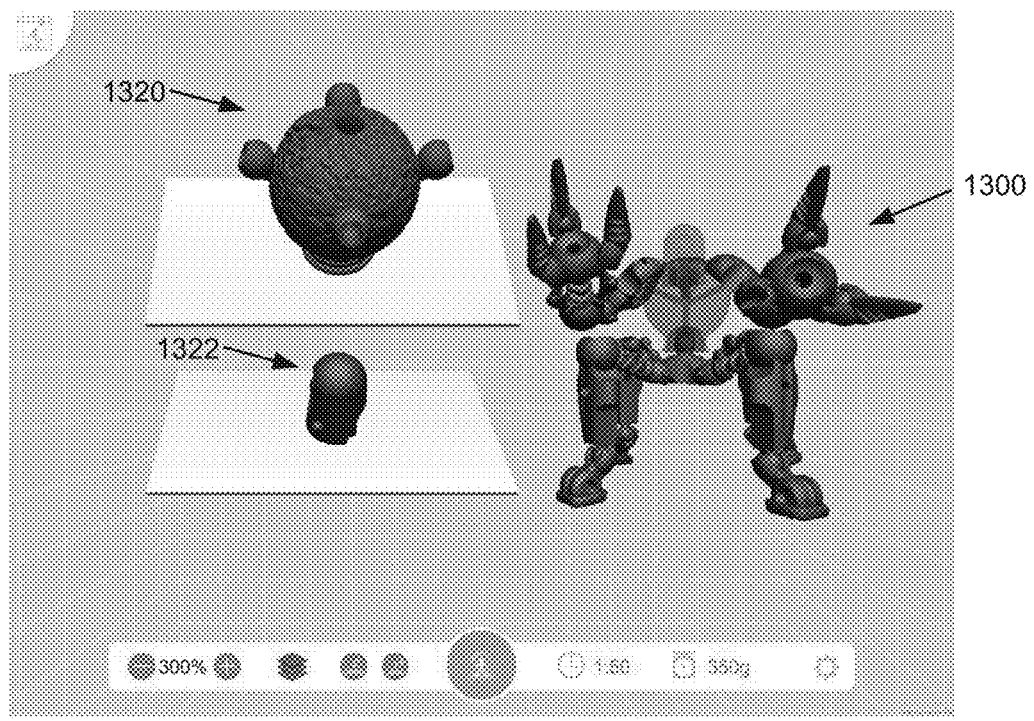
FIG. 13C shows the print user interface of FIG. 13A with only two objects selected for printing.

FIGS. 13A-C show an example print user interface. FIG. 13A includes regular sized parts 1302, 1304. FIG. 13B shows the print user interface of FIG. 13A including any enlarged parts and the additional build plates 1310, 1312 required. FIG. 13C shows the print user interface of FIG. 13A with only two objects selected for printing.

Example Global Gallery: According to one or more embodiments, models created in the system can be automatically (unless otherwise specified by the user) uploaded to a global model gallery that showcases what the community of users is creating. Users can browse this gallery in the system or on the web and select models to "like". When browsing the global gallery within the system, the user can select a model to remix, i.e., he can pull the model into his own library and start to improve upon the design or alter it in any way as long as the original creator allows such remixing. In the case where the user doesn't own all the parts included in the model, he can either insert his own parts or easily buy the missing parts through the system's marketplace.

Example Sharing Functions: From the system, a user can easily share his designs via the global gallery, or social media channels (e.g., Facebook, twitter, email) via posting to other popular social networking sites and 3D model repositories. According to one or more embodiments, the user can create comic book-like stories using his models and various environments and props that may include animations and/or user interaction. In some examples, the system can record animations of the virtual models and enable sharing online.

UI Design Embodiments: According to some embodiments, the user interface has been optimized for touch devices and to present the right amount of information and options to the user at every point in time. For example, the system can be configured to group functions into "drawers" (e.g., a part drawer or a tool drawer to modify parts) that can be dragged on or off the screen. These UI drawers include wheels that can be rotated to access additional options (e.g., certain parts or colors), with the innermost wheels grouping and/or specifying what functions are accessible on outer wheels. In some embodiments, the display drawers can be dragged further onto the screen to view more information about the items they include.

Most functions in the system are performed on the models themselves, be it painting a texture on them or posing individual parts. In some embodiments, the system contains specific modes that allow the user to perform specific tasks, such as texture paint, arrange parts for 3D printing or to pose and take photos of a model. In the user interfaces shown, the system is configured to minimize the use of text in the system in order to ensure the system can be used by children of any age and speaking any language.

Example Application Optimizations: The system can be designed to work on low-end tablets. For example, where the system is embodied in an application for download and/or purchase, the application is configured to minimize processing and/or memory requirements. In some example, special care has been taken to optimize the system for available memory and CPU of conventional tablets, including using various level-of-detail techniques when displaying the models on the screen and bump maps to display displaced meshes on high-polygon parts. In some embodiments, the system tailors level-of-detail settings automatically to the device on which it is installed and further tailors uses of bump maps for displaying meshes on various parts.

Modeling Community: According to various embodiments, the system can include web based access points and/or stores. In some examples a user can access an online store associated with the system to purchase customized parts, blueprints, and/or models. In some embodiments, the store can make available additional functions to be used in the system (e.g., sale of additional tools to modify parts and models in the system). In other examples, available options can include any one or more of the following options: (1) sale of settings (e.g., backgrounds), scenarios (e.g., stories), or additional tools (e.g., animation tools) to make the models come to life within the system; (2) in-app ordering of printed models from third party or system managed 3D printer farm; (3) sale of additional merchandise for each model, e.g., a T-shirt, full-size poster, etc.; (4) licensing of content from 3rd party content owners that is then turned into parts and kits within the system and sold alongside system provided content According to other embodiments, the system can be configured to enable development of custom parts and/or custom models. In some examples, users can upload their own parts and models to the store for sale to other users. The system can also make other functions available within the design environment. For example, adding virtual wires to the visual display of the model can enable the user to activate lights, trigger sounds, movement, etc. on the visual display of the model. In some settings, the design environment can be used to train the visual models to move, walk, perform actions, etc. In one example, these operations trained on the visual display can be "recorded" on the system to provide code that can be executed on a physical model. In other embodiments, the recording of movements can be used within the design environment to generate animations, and/or have the visual model perform virtual tasks in game environments, among other options.

According to other embodiments, the virtual animations can be used to control physical models and any embedded motors, sensors, and/or other circuitry. In some examples, the system can optimize model printing based on user selections of motors, circuitry, etc., that they wish to include.

In further embodiments, the virtual and/or physical models can be manipulated in virtual reality modes, including virtual reality games. In some examples, virtual displays of models can be used to control competitions between physical models of toys, e.g., fights between models, puzzle solving, joint challenges, etc.

Figure 4:
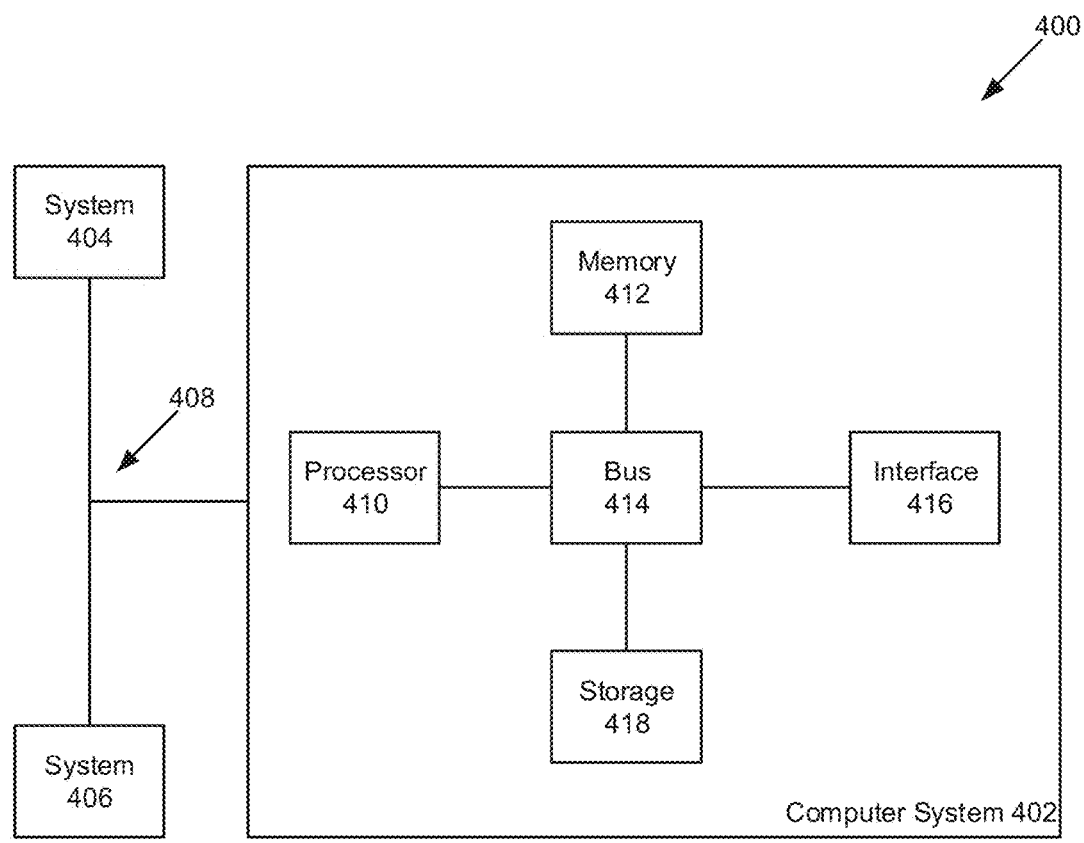
FIG. 4 is a block diagram of a general purpose computer system, on which various aspects and embodiments can be executed.

Referring to FIG. 4, there is illustrated a block diagram of a distributed computer system 400, in which various aspects and functions are implemented. As shown, the distributed computer system 400 includes one or more computer systems that exchange information. More specifically, the distributed computer system 400 includes specially configured computer systems 402, 404 and 406. As shown, the computer systems 402, 404 and 406 are interconnected by, and may exchange data through, a communication network 408. For example, system engines, system components, subsystems, and/or modules can be implemented on 402, which can communicate with other systems (404, 406), which operate together to provide the functions and operations as discussed herein.

In some embodiments, the network 408 may include any communication network through which computer systems may exchange data. To exchange data using the network 408, the computer systems 402, 404 and 406 and the network 408 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS4, JSON, SOAP, CORBA, REST and Web Services. To ensure data transfer is secure, the computer systems 402, 404 and 406 may transmit data via the network 408 using a variety of security measures including, for example, TLS, SSL or VPN. While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes at least one processor 410, a memory 412, a bus 414, an interface 416 and data storage 418. To implement at least some of the aspects, functions and processes disclosed herein, the processor 410 performs a series of instructions that result in manipulated data. The processor 410 may be any type of processor, multiprocessor or controller. Some exemplary processors include commercially available processors such as an INTEL XEON, ITANIUM, CORE, CELERON, or PENTIUM processor, an AMD OPTERON processor, a SUN ULTRASPARC or IBM POWER5+ processor and an IBM mainframe chip. The processor 410 is connected to other system components, including one or more memory devices 412, by the bus 414.

The memory 412 stores programs and data during operation of the computer system 402. Thus, the memory 412 may be a relatively high performance, volatile, random access memory such as a dynamic random access memory (DRAM) or static memory (SRAM). However, the memory 412 may include any device for storing data, such as a disk drive or other non-volatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the bus 414. The bus 414 may include one or more physical busses, for example, busses between components that are integrated within the same machine, but may include any communication coupling between system elements including specialized or standard computing bus technologies such as IDE, SCSI, PCI and InfiniBand. The bus 414 enables communications, such as data and instructions, to be exchanged between system components of the computer system 402.

The computer system 402 also includes one or more interface devices 416 such as input devices, output devices and combination input/output devices (including for example touch based interfaces). Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage 418 includes a computer readable and writeable nonvolatile, or non-transitory, data storage medium in which instructions are stored that define a program or other object that is executed by the processor 410. The data storage 418 also may include information that is recorded, on or in, the medium, and that is processed by the processor 410 during execution of the program. More specifically, the information may be stored in one or more data structures specifically configured to conserve storage space or increase data exchange performance.

The instructions stored in the data storage may be persistently stored as encoded signals, and the instructions may cause the processor 410 to perform any of the functions described herein. The medium may be, for example, optical disk, magnetic disk or flash memory, among other options. In operation, the processor 410 or some other controller causes data to be read from the nonvolatile recording medium into another memory, such as the memory 412, that allows for faster access to the information by the processor 410 than does the storage medium included in the data storage 418. The memory may be located in the data storage 418 or in the memory 412, however, the processor 410 manipulates the data within the memory, and then copies the data to the storage medium associated with the data storage 418 after processing is completed. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions can be implemented, aspects and functions are not limited to being implemented on the computer system 402 as shown in FIG. 4. Various aspects and functions may be implemented on one or more computers having different architectures or components than that shown in FIG. 4. For instance, the computer system 402 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a WINDOWS-based operating system, such as, WINDOWS NT, WINDOWS 2000 (WINDOWS ME), WINDOWS XP, WINDOWS VISTA, WINDOWS 7 or 8 operating systems, available from the Microsoft Corporation, a MAC OS Systems, iOS, available from Apple Computer, one of many Linux-based operating system distributions, for example, the ANDROID OS for mobile devices, the Enterprise LINUX operating system available from Red Hat Inc., a SOLARIS operating system available from Sun Microsystems, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Objective C, or Javascript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one or more embodiments of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A system for generating three dimensional (3D) printable models, the system comprising:
    at least one memory device encoding at least one modeling engine program useable to generate the 3D printable models;
    at least one processor operatively connected to the at least one memory device and configured to run the at least one modeling engine program to
    display a plurality of virtual parts;
    receive selection of parts from among the plurality of virtual parts and display the selected parts within a modeling environment display for the at least one modeling engine program; and
    modify, automatically, programmatic definition of the selected parts responsive to assembly in the modeling environment display for the at least one modeling engine program;
    wherein the at least one processor is configured to run the at least one modeling engine program to automatically modify the programmatic definition of the selected parts responsive to user modification of a part's surface in the modeling environment display;
    wherein the at least one processor is configured to run the at least one modeling engine program to use a UV map for at least one of the selected parts to associate one or more images and one or more displacement maps with the at least one of the selected parts to dynamically change the at least one of the selected parts, wherein the UV map has been previously derived automatically using a programmatic definition of solids used to build the at least one of the selected parts;
    wherein the at least one processor is configured to run the at least one modeling engine program to manage print characteristics of the selected parts on a 3D printer;
    wherein the at least one processor is configured to run the at least one modeling engine program to prevent user modification that exceeds physical constraints of the 3D printer; and
    wherein the at least one processor is configured to run the at least one modeling engine program to preserve printability after the user modification of the part's surface in the modeling environment display by ensuring any carve out Constructive Solid Geometry (CSG) subform for the part is always performed subsequent to any CSG operation adding a CSG subform for the user modification of the part's surface.

2. The system for generating 3D printable models of claim 1, wherein the at least one processor is configured to run the at least one modeling engine program to connect the selected parts based on programmatically defined connectors associated with the selected parts.

3. The system for generating 3D printable models of claim 2, wherein the at least one processor is configured to run the at least one modeling engine program to identify compatible connectors associated with a first of the selected parts and a second of the selected parts displayed in the modeling environment display.

4. The system for generating 3D printable models of claim 1, wherein the at least one processor is configured to run the at least one modeling engine program to alter user modification that exceeds physical constraints of the 3D printer.

5. The system for generating 3D printable models of claim 1, wherein the at least one processor is configured to run the at least one modeling engine program to register the 3D printer and capture printer properties of the 3D printer during registration.

6. The system for generating 3D printable models of claim 1, wherein the at least one processor is configured to run the at least one modeling engine program to constrain physical properties of a virtual model built from the selected parts and optimize printing of the virtual model to occur directly on a print bed of the 3D printer.

7. A system for generating three dimensional (3D) printable models, the system comprising:
- at least one memory device encoding at least one modeling engine program useable to generate the 3D printable models;
- at least one processor operatively connected to the at least one memory device and configured to run the at least one modeling engine program to
- display a plurality of virtual parts;
- receive selection of parts from among the plurality of virtual parts and display the selected parts within a modeling environment display for the at least one modeling engine program; and
- modify, automatically, programmatic definition of the selected parts responsive to assembly in the modeling environment display for the at least one modeling engine program;
- wherein the at least one processor is configured to run the at least one modeling engine program to connect the selected parts based on programmatically defined connectors associated with the selected parts;
- wherein the at least one processor is configured to run the at least one modeling engine program to identify compatible connectors associated with a first of the selected parts and a second of the selected parts displayed in the modeling environment display, wherein the compatible connectors comprise 3D shapes that are designed to snap together, once 3D printed, to build a physical object from the first part and the second part by moveably connecting the first part with the second part using the 3D shapes of the compatible connectors;
- wherein the at least one processor is configured to run the at least one modeling engine program to display a visual indication of the compatible connectors responsive to a proximity between the first part and the second part in the modeling environment display, wherein the visual indication provides a user an indication that a moveable 3D connection can be made between the first part and the second part, and wherein the programmatic definition is modified to connect the first part and the second part via the compatible connectors responsive to the user releasing one of the first and second parts within the proximity of the other of the first and second parts;
- wherein the at least one processor is configured to run the at least one modeling engine program to automatically modify the programmatic definition of the selected parts responsive to user modification of a part's surface in the modeling environment display; and
- wherein the at least one processor is configured to run the at least one modeling engine program to preserve printability after the user modification of the part's surface in the modeling environment display by ensuring any carve out Constructive Solid Geometry (CSG) subform for the part is always performed subsequent to any CSG operation adding a CSG subform for the user modification of the part's surface.

8. The system for generating 3D printable models of claim 7, comprising:
- a mobile computing device comprising the at least one processor; and
- an application for the mobile computing device, the application comprising the at least one modeling engine program;
- wherein the at least one processor is configured to run the at least one modeling engine program to use a UV map for at least one of the selected parts to associate one or more images and one or more displacement maps with the at least one of the selected parts to dynamically change the at least one of the selected parts, wherein the UV map has been previously derived automatically using a programmatic definition of solids used to build the at least one of the selected parts.

9. The system for generating 3D printable models of claim 7, wherein the at least one processor is configured to run the at least one modeling engine program to orient and display attachment points, and to display connecting lines between parts, as each of two or more parts are moved into proximity with compatible connectors.

10. The system for generating 3D printable models of claim 7, wherein the at least one processor is configured to run the at least one modeling engine program to manage print characteristics of the selected parts on a 3D printer; and wherein the at least one processor is configured to run the at least one modeling engine program to prevent user modification that exceeds physical constraints of the 3D printer.

11. A computer implemented method for designing three dimensional (3D) models, comprising:
- presenting a user interface component through which a plurality of virtual parts are organized in selectable displays, wherein the user interface component organizes the plurality of virtual parts into a hierarchical display of parts and part groupings for selection in a modeling environment, and the hierarchical display includes rotatable ring members that organize the part groupings on a first ring and the parts on a second ring;
- receiving, through the user interface, user selection of parts from the plurality of virtual parts to build a virtual 3D model in the modeling environment, wherein the user interface component includes a printing user interface for managing 3D printing of the virtual 3D model;
- receiving user instruction for modifying at least one of the selected parts within the modeling environment, including a user modification of a surface of the at least one of the selected parts in the modeling environment;
- preserving printability after the user modification of the surface of the at least one of the selected parts in the modeling environment by ensuring any carve out Constructive Solid Geometry (CSG) subform for the part is always performed subsequent to any CSG operation adding a CSG subform for the user modification of the surface of the at least one of the selected parts;
- determining a print order for parts of the virtual 3D model;
- displaying print groupings of the ordered parts in accordance with the determining;

receiving user selection of one or more parts within the virtual 3D model to be 3D printed;

validating the user instruction against physical constraints of an associated 3D printer; and outputting the virtual 3D model for 3D printing on the associated 3D printer after the validating.

12. The computer implemented method for designing 3D models of claim 11, wherein the validating comprises constraining user modification to limit the virtual 3D model to have physical properties that are printable by the associated 3D printer.

13. The computer implemented method for designing 3D models of claim 11, comprising:

registering the associated 3D printer;

acquiring the physical constraints of the associated 3D printer;

animating assembly of the selected parts into the virtual 3D model; and optimizing 3D printing of the virtual 3D model to occur on the associated 3D printer.

14. The computer implemented method for designing 3D models of claim 11, wherein the rotatable ring members are rotatable to enable access to additional functions or tools.

15. The computer implemented method for designing 3D models of claim 14, wherein the rotatable ring members are arranged in the user interface component as a drawer, and the method comprises opening and closing the drawer responsive to a user.

16. The computer implemented method for designing 3D models of claim 11, wherein the user interface component includes a time control display, and the method comprises animating steps of a build of the virtual 3D model responsive to user input on the time control display.

17. The computer implemented method for designing 3D models of claim 11, comprising:

accepting definition of custom virtual parts within the modeling environment; and publishing the custom virtual parts for use by other users.

18. The computer implemented method for designing 3D models of claim 17, comprising:

capturing information on definition of the custom virtual parts and assembly of, at least, the custom virtual parts into a virtual model; and validating the custom virtual parts for use in the modeling environment.

19. The computer implemented method for designing 3D models of claim 18, comprising defining a virtual model kit including, at least, the custom virtual parts and the information on the assembly of the custom virtual parts.

* * * * *